(12) United States Patent
Yang

(10) Patent No.: US 6,573,940 B1
(45) Date of Patent: Jun. 3, 2003

(54) SAMPLE RATE CONVERTERS FOR VIDEO SIGNALS

(75) Inventor: Feng Yang, Plano, TX (US)

(73) Assignee: Techwell, INC, San Jose, CA (US)

(*) Notice: Subject to any disclaimer, the term of this patent is extended or adjusted under 35 U.S.C. 154(b) by 0 days.

(21) Appl. No.: 09/535,205

(22) Filed: Mar. 27, 2000

Related U.S. Application Data

(63) Continuation-in-part of application No. 09/387,389, filed on Sep. 2, 1999, which is a continuation-in-part of application No. 09/399,924, filed on Sep. 21, 1999, now Pat. No. 6,377,313.
(60) Provisional application No. 60/171,086, filed on Dec. 14, 1999.

(51) Int. Cl.[7] .................................................. H04N 7/01
(52) U.S. Cl. ........................ 348/441; 348/663; 348/625
(58) Field of Search ................................ 348/441, 453, 348/663, 625; H04N 7/01, 11/20

(56) References Cited

U.S. PATENT DOCUMENTS 4,819,062 A * 4/1989 Dongil et al. ............... 348/625
5,889,562 A * 3/1999 Pau ............................. 348/453

* cited by examiner

Primary Examiner—Sherrie Hsia
(74) Attorney, Agent, or Firm—Dinh & Associates

(57) ABSTRACT

A sample rate converter that includes a number of selector elements coupled to a summing circuit. Each selector element receives a respective set of one or more processed data samples and provides one of the processed data samples. Each processed data sample is generated by delaying an input sample by zero or more clock cycles and scaling the sample by a particular scaling factor (e.g. $2^N$, where N is 0, 1, 2, and so on). The summing circuit receives and combines the processed data samples from the selector elements to generate an output sample. A delay and scaler circuit can receive the input sample and provide one set of processed data samples for each selector element. The delay and scaler circuit can include one or more delay elements coupled in series and to a scaling circuitry that scales selected ones of the input and delayed samples. The scaling can be implemented by simply bit-shifting the samples. The elements of the sample rate converter can be configured to implement a K-tap, P-phase interpolator.

27 Claims, 17 Drawing Sheets

SAMPLE RATE CONVERTERS FOR VIDEO SIGNALS

CROSS-REFERENCES TO RELATED APPLICATIONS

This application is a continuation-in-part of U.S. patent applications Ser. No. 09/387,389, entitled "MULTI-STANDARD VIDEO DECODER," filed Sep. 2, 1999; and Ser. No. 09/399,924, entitled "SHARPNESS ENHANCEMENT CIRCUIT FOR VIDEO SIGNALS," filed Sep. 21, 1999, U.S. Pat. No. 6,377,313, both of which are incorporated herein by reference in their entirety for all purposes.

This application further claims the benefit of U.S. provisional Application Serial No. 60/171,086, entitled "SAMPLE RATE CONVERTER FOR VIDEO SIGNALS," filed Dec. 14, 1999, which is incorporated herein by reference.

BACKGROUND OF THE INVENTION

The present invention relates to video processing, and more particularly to sample rate converters suitable for use with video and other types of data.

Sample rate converters are widely used in digital signal processing to convert data samples that have been sampled at one sample rate to data samples at a second sample rate. The second sample rate may be selected for ease of data processing, to synchronize the output data samples to a particular output clock, or for other purposes. For example, in video applications, the input video signal may be sampled at a fixed sample rate (e.g. 27.0 MHz) and sample rate conversion may be used to generate video samples at a second sample rate related to the color subcarrier frequency (e.g. 14.318 MHz for NTSC compliant video). Sample rate conversion is also commonly used for audio, digital demodulation, and other applications.

Various techniques are conventionally used for sample rate conversion. In one simple technique, the input samples are upconverted to a higher sample rate, filtered, and then decimated to the required output sample rate. This technique generally works well when the input and output sample rates are related by a ratio of integers. However, the filtering is performed at the high upconverted rate, and this is typically undesirable or may be impractical for some applications.

Sample rate conversion is also conventionally achieved through the use of an interpolator. For each output clock cycle, the interpolator computes an interpolated sample at a particular point in time (e.g. corresponding to the rising edge of the output clock). The interpolated sample is generated based on two or more input samples, and is used as an estimate for the desired output sample. The interpolator can be implemented using delay elements, multipliers, and an adder. However, implementation of multipliers in hardware or software is typically costly.

Thus, sample rate converters that provide the required functionality and can be efficiently implemented are highly desirable.

SUMMARY OF THE INVENTION

The invention provides sample rate converter architectures that can be more efficiently implemented than conventional ones. A sample rate converter receives input samples at an input sample rate $f_{IN}$ and generates output samples at an output sample rate $f_{OUT}$. Sample rate conversion can be achieved using interpolation, wherein each output sample is computed as a sum of a number of weighted input samples. The scaling factors to generate the weighted input samples vary over time depending on the relative phase between the input and output sample clocks.

Simplification of the sample rate converter is first achieved by implementing the multipliers with scalers and adders. Further simplification is achieved by using a smaller number of adders, and providing the required operands to the adders via selector elements (e.g. multiplexers). The invention provides various arrangements for the adders and selector elements. The arrangement most suitable for a particular application is dependent on a number of factors, such as the number of taps for the interpolator being implemented, the number of phases to be interpolated, the resolution of the scaling factors, and others.

An embodiment of the invention provides a sample rate converter that includes a number of selector elements coupled to a summing circuit. Each selector element receives a respective set of one or more processed data samples and provides one of the processed data samples. Each processed data sample is generated by delaying an input sample by zero or more clock cycles and scaling the sample by a particular scaling factor (e.g. $2^N$, where N is 0, 1, 2, and so on). The summing circuit receives and combines the processed data samples from the selector elements to generate an output sample. The sample rate converter typically further includes a delay and scaler circuit that receives the input sample and provides one set of processed data samples for each selector element. The elements of the sample rate converter can be configured to implement a K-tap, P-phase interpolator, where K and P are each equal to two or greater, and P can further be a power of twos.

The delay and scaler circuit can include one or more delay elements coupled in series and to a scaling circuitry. One delay element receives the input sample, and each delay element provides a delayed sample. The scaling circuitry receives the input sample and one or more delayed samples, and scales selected ones of the input and delayed samples. The scaling can be implemented by simply bit-shifting the samples.

Another embodiment of the invention provides a sample rate converter that includes a delay circuit, a number of scaler and adder circuits, a number of selector elements, and a summing circuit. The delay circuit receives an input sample and provides a set of one or more delayed samples. The scaler and adder circuits couple to the delay circuit, and each scaler and adder circuit receives the input sample or one delayed sample and provides a respective set of processed samples. The selector elements couple to the scaler and adder circuits, and each selector element receives the respective set of processed data samples and provides one of the processed data samples. The summing circuit receives and combines the samples provided by the selector elements to generate an output sample.

Each scaler and adder circuit can include zero or more delay elements coupled in series and further to at least one adder. The delay elements delay respective received samples. The adder receives and combines selected ones of the received and delayed samples to generate the set of processed data samples.

Yet another embodiment of the invention provides a sample rate converter that includes a delay circuit, a number of scaler and adder circuits, and a selector element. The delay circuit receives an input sample and provides a set of one or more delayed samples. Each scaler and adder circuit receives a set of input and delayed samples and provides an interpolated sample. The selector element receives interpolated samples from the scaler and adder circuits and provides one of the interpolated samples as an output sample.

Another embodiment of the invention provides a method for performing sample rate conversion. In accordance with the method, a number of sets of processed data samples are received. Each processed data sample is generated by delaying an input sample by zero or more clock cycles and scaling the sample by a particular scaling factor. One processed data sample from each of the plurality of sets is selected. The selected processed data samples from the sets, which are associated with a particular phase to be interpolated, are combined to generate an output sample.

The invention further provides video decoders, other devices, and signal processing techniques that incorporate the sample rate converters described above.

The foregoing, together with other aspects of this invention, will become more apparent when referring to the following specification, claims, and accompanying drawings.

DESCRIPTION OF THE SPECIFIC EMBODIMENTS

Figure 1:
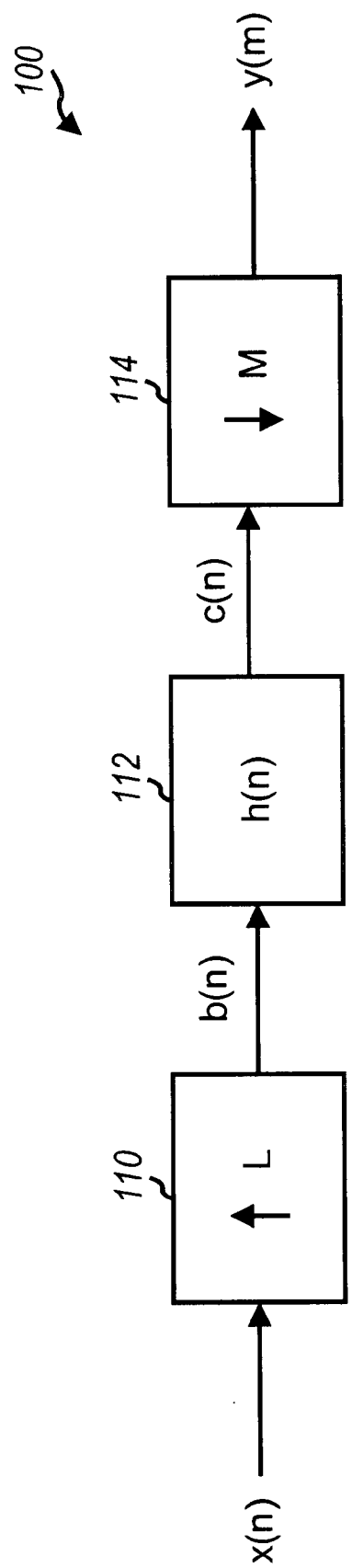
FIG. 1 shows a block diagram of a sample rate converter that can be used to generate output data samples y(m) at an output sample rate $f_{OUT}$ from input data samples x(n) at an input sample rate $f_{IN}$.

FIG. 1 shows a block diagram of a sample rate converter 100 that can be used to generate output data samples y(m) at an output sample rate $f_{OUT}$ from input data samples x(n) at an input sample rate $f_{IN}$, where the input and output sample rates may not be equal. The input samples x(n) are provided to an upconversion element 110 that provides upconverted samples b(n) at a higher sample rate, or more specifically, at L times the input sample rate, $L \cdot f_{IN}$. Upconversion is typically achieved by inserting (L−1) zeros between each sequential pair of input samples x(n), which is also referred to as "zero packing." The upconverted samples b(n) are provided to a filter 112 that filters the samples with a transfer function h(n). Filter 112 removes spectral components introduced by the zero packing such that these components do not alias and fold inband in the subsequent downconversion stage. The filter samples c(n) are provided to a downconversion element 114 that decimates the samples to generate the output samples y(m) at the output sample rate, $f_{OUT} = R \cdot f_{IN}$, where R is the sample rate conversion factor and is computed as R=L/M.

L and M are integers and upconversion element 110 can be implemented with a zero-fill element that inserts (L−1) zeros between each sequential pair of input samples x(n). In the frequency domain, the spectrum of b(n) repeats at integer multiples of $f_{IN}$. Filter 112 filters at least some of the images at $2 \cdot f_{IN}$, $3 \cdot f_{IN}$, ... and $(L-1) \cdot f_{IN}$ such that these spectral components do not alias in the subsequent downconversion stage. Downconversion element 114 can be implemented by simply selecting every M-th sample of c(n).

The sample rate converter architecture shown in FIG. 1 can be used when L and M are integers. When the conversion factor R cannot be expressed as a ratio of integers, other sample rate converter architectures are typically used.

In FIG. 1, filter 112 provides filtered samples c(n) at the upconverted sample rate of $L \cdot f_{IN}$, and the output samples y(m) are selected from among the filtered samples c(n). Thus, filter 112 is implemented using one set of coefficients. However, in this design, filter 112 is operated at $L \cdot f_{IN}$, which is typically much higher than desired or possible.

The sample rate converter shown in FIG. 1 (also referred to as the L/M sample rate converter) is one design of a poly-phase filter that can be used to extrapolate a particular value between the available data samples. An interpolator is another design of the poly-phase filter that can also be used is extrapolate values between data samples. These different designs provide different means of generating coefficients used to extrapolate the desired values.

Figure 2:
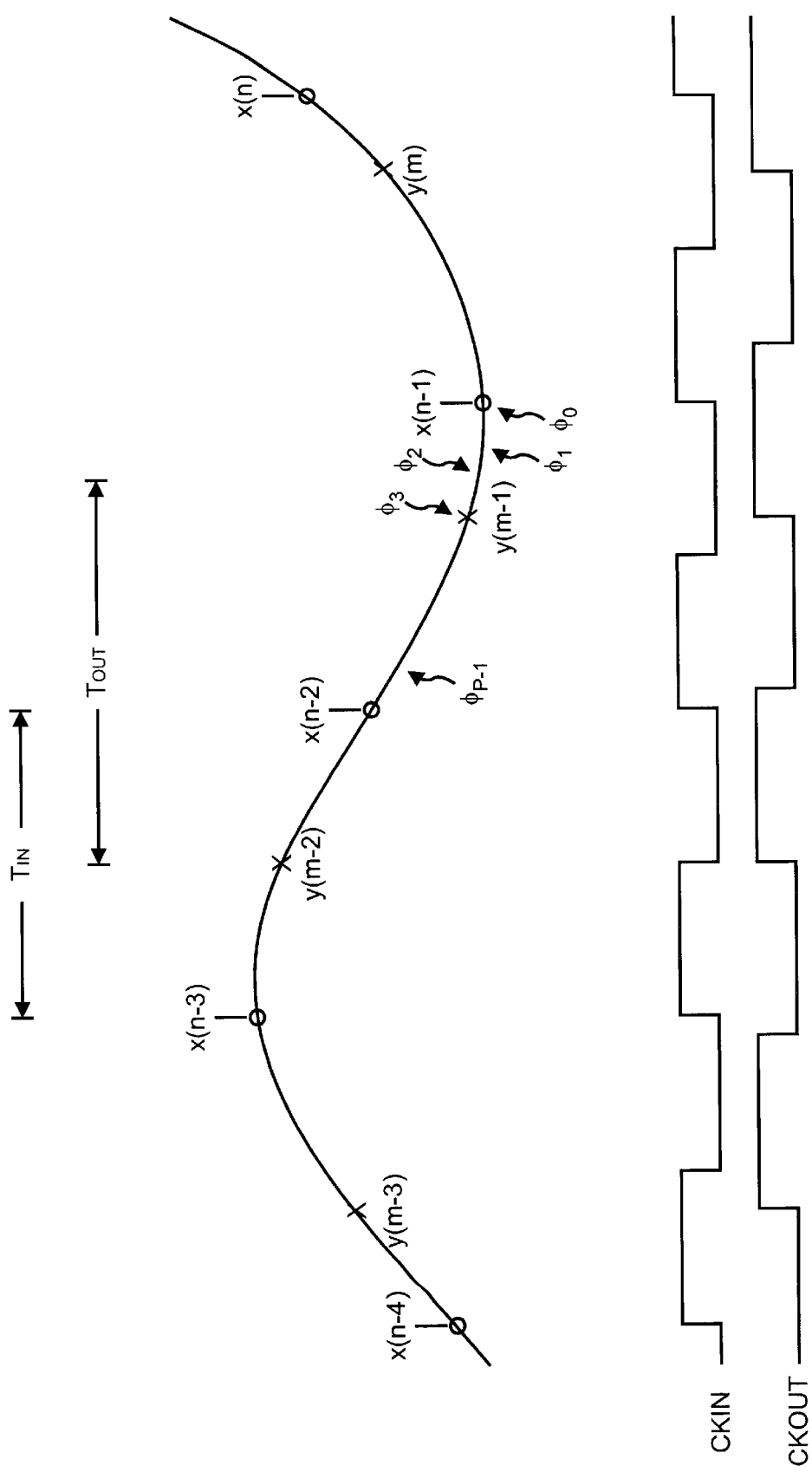
FIG. 2 is a diagram that illustrates the sample rate conversion process using interpolation.

FIG. 2 is a diagram that illustrates the sample rate conversion process using interpolation. The input samples x(n), x(n−1), ... x(n−4) and so on are sampled at discrete points in time by an input clock CKIN, and are temporally spaced by a period of $T_{IN} = 1/f_{IN}$. The output samples y(m), y(m−1), ... y(m−3) and so on are generated from the input samples based on an output clock CKOUT, and are provided at discrete points in time temporally spaced by a period of $T_{OUT} = 1/f_{OUT}$. It can be noted that, in many instances, the output sample falls between a pair of input samples.

Figure 3:
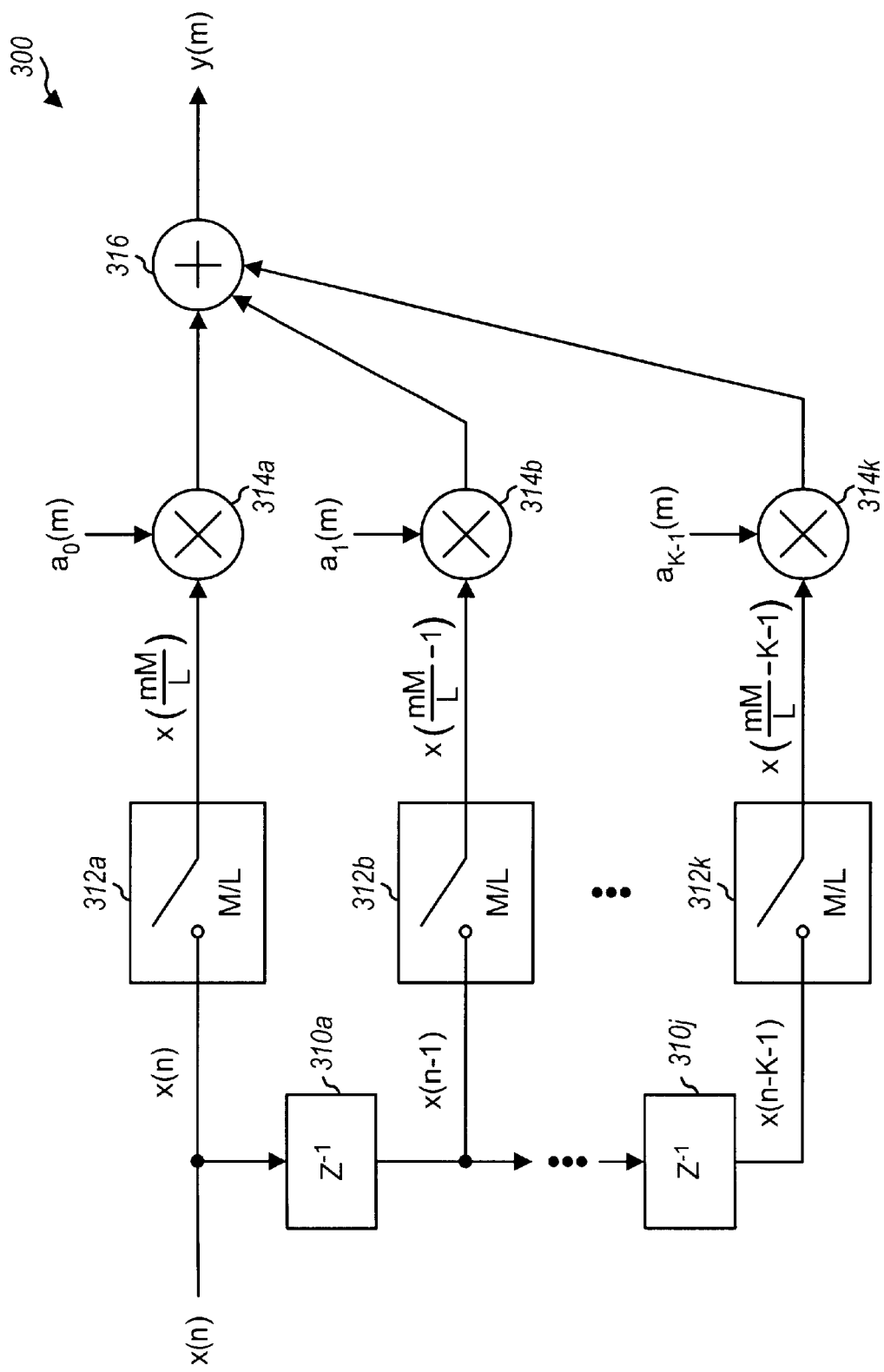
FIG. 3 shows a block diagram of an embodiment of a sample rate converter that performs interpolation to generate output data samples.

FIG. 3 shows a block diagram of an embodiment of a sample rate converter 300 that performs interpolation to generate output data samples. Sample rate converter 300 can be used for various sample rate conversion factors. The input samples x(n) are provided to a set of (K−1) delay elements 310a through 310j coupled in series. Each delay element provides one input sample period of delay (i.e., $T_{delay} = 1/f_{IN}$), and the delayed sample is provided to a respective sampler.

Samplers 312a through 312k (digitally) sample the respective received samples x(n) through x(n−K−1) at time intervals of M/L and provide the output samples to multipliers 314a through 314k, respectively. Multipliers 314a through 314k scale the received samples with coefficients $a_0(m)$ through $a_{K-1}(m)$, respectively, and provide the scaled samples to an adder 316. Coefficients $a_0(m)$ through $a_{K-1}(m)$ are time-varying scaling factors, as described below. Adder 316 receives and combines the sets of scaled samples from multipliers 314a through 314k to generate the output samples y(m).

In FIG. 3, delay elements 310a through 310j, multipliers 314a through 314k, and adder 316 implement a filter having the desired transfer function h(n). The conversion of the sample rate from $f_{IN}$ to $f_{OUT}$ is achieved by samplers 312a through 312k, which are integrated within the filter. Samplers 312a through 312k effectively perform the functions of upconversion element 110 and downconversion element 114 in FIG. 1. Delay elements 310a through 310j are clocked at the input sample rate $f_{IN}$, and the output samples y(m) are typically latched by a register or a latch clocked at the output sample rate $f_{OUT}$. K represents the number of taps of the filter, and larger K generally corresponds to improved performance.

Referring back to FIG. 2, sample rate converter 300 is capable of interpolating values between a pair of input samples (e.g. x(n−1) and x(n−2)) at P different (typically uniformly spaced) phases $\phi_0, \phi_1, \phi_2, \ldots$ and $\phi_{P-1}$ of the input clock CKIN. The interpolated sample at phase $\phi_0$ can simply be the input sample (e.g. x(n−1)). Each output sample y(m) is selected from among the P interpolated samples. The selected sample is typically the sample located closest in time to the sampling edge of the output clock CKOUT. For example, in FIG. 2, sample rate converter 300 is capable of generating interpolated samples at phases $\phi_0, \phi_1, \phi_2, \ldots$ and $\phi_{P-1}$ and the output sample y(m−1) is selected as the interpolated sample at phase $\phi_3$.

In a typically sample rate converter design, to reduce the amount of computation, only the interpolated sample at the desired phase is computed for each cycle of the output clock CKOUT. The interpolated samples at other phases are not computed since these samples are not needed. The desired interpolated sample can be computed as a weighted average of a set of K input samples, with the weighting determined by the K coefficients $a_0(m)$ through $a_{K-1}(m)$. Each phase $\phi_0$ through $\phi_{P-1}$ is associated with a different set of K coefficients.

An interpolated sample $p_i(n)$ at phase $\phi_i$ can be computed as:

$$p_i(n) = \sum_{j=0}^{K-1} a_{ij} \cdot x(n-j). \quad \text{Eq. (1)}$$

where $p_i(n)$ is the interpolated sample at phase $\phi_i$, $a_{ij}$ is the coefficient associated with phase $\phi_i$ and the j-th input sample x(n−j). Increasing the number of discrete phases for each input clock cycle (i.e., increasing P) improves the accuracy of the output samples, since larger P results in a smaller error between the phase of the selected interpolated sample p(n) and the phase of the desired output sample. The interpolated sample at each of the P phases is compute using a different set of K coefficients $a_0, a_1, \ldots a_{K-1}$.

If the input and output sample rates are not equal ($f_{IN} \neq f_{OUT}$), the phase difference between the input and output clocks varies over time. The output samples y(m) are thus selected from interpolated samples at varying phases. For example, in FIG. 2, the interpolated sample at phase $\phi_3$ is selected as the output sample y(m−1) and the interpolated sample at phase $\phi_4$ is selected as the output sample y(m−2). Thus, the coefficients used to compute the desired interpolated sample vary over time.

For a linear interpolator (i.e. K=2), an interpolated sample at phase $\phi$ can be computed based on two input samples (e.g., x(n−1) and x(n−2)). For a 4-tap interpolator (i.e. K=4), four input samples (e.g., x(n), x(n−1), x(n−2), and x(n−3)) are used to generate an interpolated sample. Generally, for a K-tap interpolator, up to K input samples x(n) through x(n−K−1) are used to compute each interpolated sample. Interpolators having higher number of taps can provide interpolated samples having improved accuracy, but typically require more hardware and/or software to implement.

In FIG. 3, a set of K multipliers 314a through 314k is used to scale the input samples with time varying coefficients. Although the multipliers provide flexibility, they are costly to implement in hardware or software. By selecting proper values for the coefficients, the multipliers can be more simply implemented using adders and bit shifters.

Figure 4:
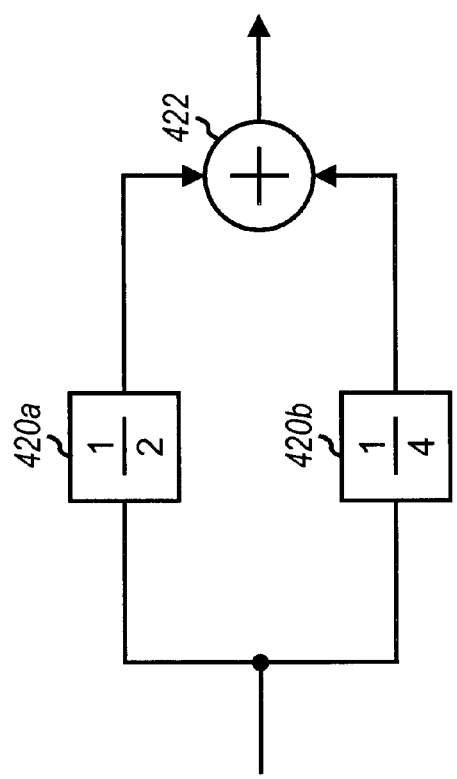
FIG. 4 is a diagram showing the implementation of a multiplier 410 using a set of scaling elements and an adder.
Figure 4:
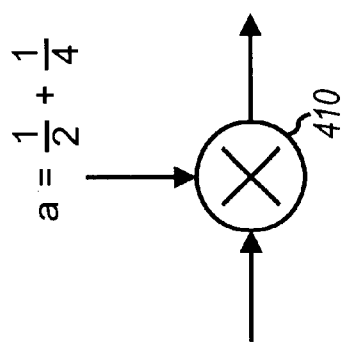

FIG. 4 is a diagram showing the implementation of a multiplier 410 using a set of scaling elements 420a and 420b and an adder 422. In this example, multiplier 410 is designed to multiply the input sample with a coefficient of ¾. This multiplication can be achieved by first scaling the input sample by factors of ½ and ¼ with scaling elements 420a and 420b, respectively. Scaling by a factor of twos can be easily achieved by bit-shifting the input sample. The scaled samples are then provided to adder 422 and summed to generate the output sample.

The invention provides various techniques to simplify the implementation of sample rate converters, such as the one shown in FIG. 3. For clarity, the invention is described below for a specific sample rate converter design. In this design, and referring back to FIG. 3, the sample rate converter is a 4-tap converter (i.e., K=4) having three delay elements, four multipliers, and one 4-input adder. The multipliers receive and scale the delayed samples x(n), x(n−1), x(n−2), and x(n−3) with coefficients $a_0(m)$, $a_1(m)$, $a_2(m)$, and $a_3(m)$, respectively. In this specific design, the input samples x(n) are interpolated at eight phases of the input clock (i.e., P=8), and eight sets of K coefficients are used for interpolation.

Table 1 lists the coefficients for a specific embodiment of a 4-tap, 8-phase sample rate converter. For illustration purpose and for ease of implementation, the coefficient are quantized to four bits (i.e., 16 levels). This specific design is selected to more cleary describe the invention. However, the invention can be applied to a sample rate converter of any number of taps K, any number of phases P, and any number of bits of resolution. Coefficients $a_0$, $a_1$, $a_2$, and $a_3$ are associated with input samples x(n), x(n−1), x(n−2), x(n−3), respectively.

TABLE 1

| | Coefficients | | | | |
| --- | --- | --- | --- | --- | --- |
| Phase | $a_0$ x(n) | $a_1$ x(n−1) | $a_2$ x(n−2) | $a_3$ x(n−3) | Number of 2-input adders |
| 0 | 2 | 12 | 2 | 0 | 3 |
| 1 | 1 | 12 | 4 | −1 | 4 |
| 2 | 0 | 12 | 6 | −2 | 4 |
| 3 | −1 | 11 | 8 | −2 | 5 |
| 4 | −1 | 9 | 9 | −1 | 5 |

TABLE 1-continued

| | Coefficients | | | | |
|---|---|---|---|---|---|
| Phase | $a_0$ x(n) | $a_1$ x(n-1) | $a_2$ x(n-2) | $a_3$ x(n-3) | Number of 2-input adders |
| 5 | −2 | 8 | 11 | −1 | 5 |
| 6 | −2 | 6 | 12 | 0 | 4 |
| 7 | −1 | 4 | 12 | 1 | 4 |

For this specific sample rate converter, the interpolated samples $p_0(m)$ through $p_7(m)$ for the eight different phases $\phi_0$ through $\phi_7$, respectively, can be computed as:

$$p_0(n)=[2 \cdot x(n)+12 \cdot x(n-1)+2 \cdot x(n-2)+0 \cdot x(n-3)]/16;$$

$$p_1(n)=[1 \cdot x(n)+12 \cdot x(n-1)+4 \cdot x(n-2)-1 \cdot x(n-3)]/16;$$

$$p_2(n)=[0 \cdot x(n)+12 \cdot x(n-1)+6 \cdot x(n-2)-2 \cdot x(n-3)]/16;$$

$$p_3(n)=[-1 \cdot x(n)+11 \cdot x(n-1)+8 \cdot x(n-2)-2 \cdot x(n-3)]/16;$$

$$p_4(n)=[-1 \cdot x(n)+9 \cdot x(n-1)+9 \cdot x(n-2)-1 \cdot x(n-3)]/16;$$

$$p_5(n)=[-2 \cdot x(n)+8 \cdot x(n-1)+11 \cdot x(n-2)-1 \cdot x(n-3)]/16;$$

$$p_6(n)=[-2 \cdot x(n)+6 \cdot x(n-1)+12 \cdot x(n-2)+0 \cdot x(n-3)]/16; \text{ and}$$

$$p_7(n)=[-1 \cdot x(n)+4 \cdot x(n-1)+12 \cdot x(n-2)+1 \cdot x(n-3)]/16.$$

It can be noted from the above set of equations for p(n) that the interpolated sample at each phase can be computed by scaling three or four input samples and summing the scaled samples. Since the coefficients are quantized to four bits, each scaling can be achieved by bit-shifting the input samples (if necessary) and summing the required bit-shifted and un-shifted samples. For example, the term $11 \cdot x(n-1)$ can be computed as $8 \cdot x(n-1)+2 \cdot x(n-1)+1 \cdot x(n-1)$. The multiplication by 8, 4, and 2 can be achieved by shifting the input sample x(n-1) by 3, 2, and 1 bit, respectively. Thus, the term $11 \cdot x(n-1)$ can be computed as a sum of three bit-shifted terms, and the summing can be performed using two 2-input adders. Bit-shifting can typically be performed at minimal (or no) additional cost in hardware.

Using the concept described above, the interpolated samples $p_0(n)$ through $p_7(n)$ at phases $\phi_0$ through $\phi_7$, respectively, can be computed using a small number of two-input adders, which is shown in the right-most column of Table 1. For example, the interpolated sample $p_3(n)$ for phase $\phi_3$ can be computed using five 2-input adders—two 2-input adders to generate the term $11 \cdot x(n-2)$ and three 2-input adders to combine the four scaled terms.

As shown in Table 1, some of the coefficients are negative. The negative factor can be integrated within the design of the adder or the scaling element, as is known in the art.

Figure 5:
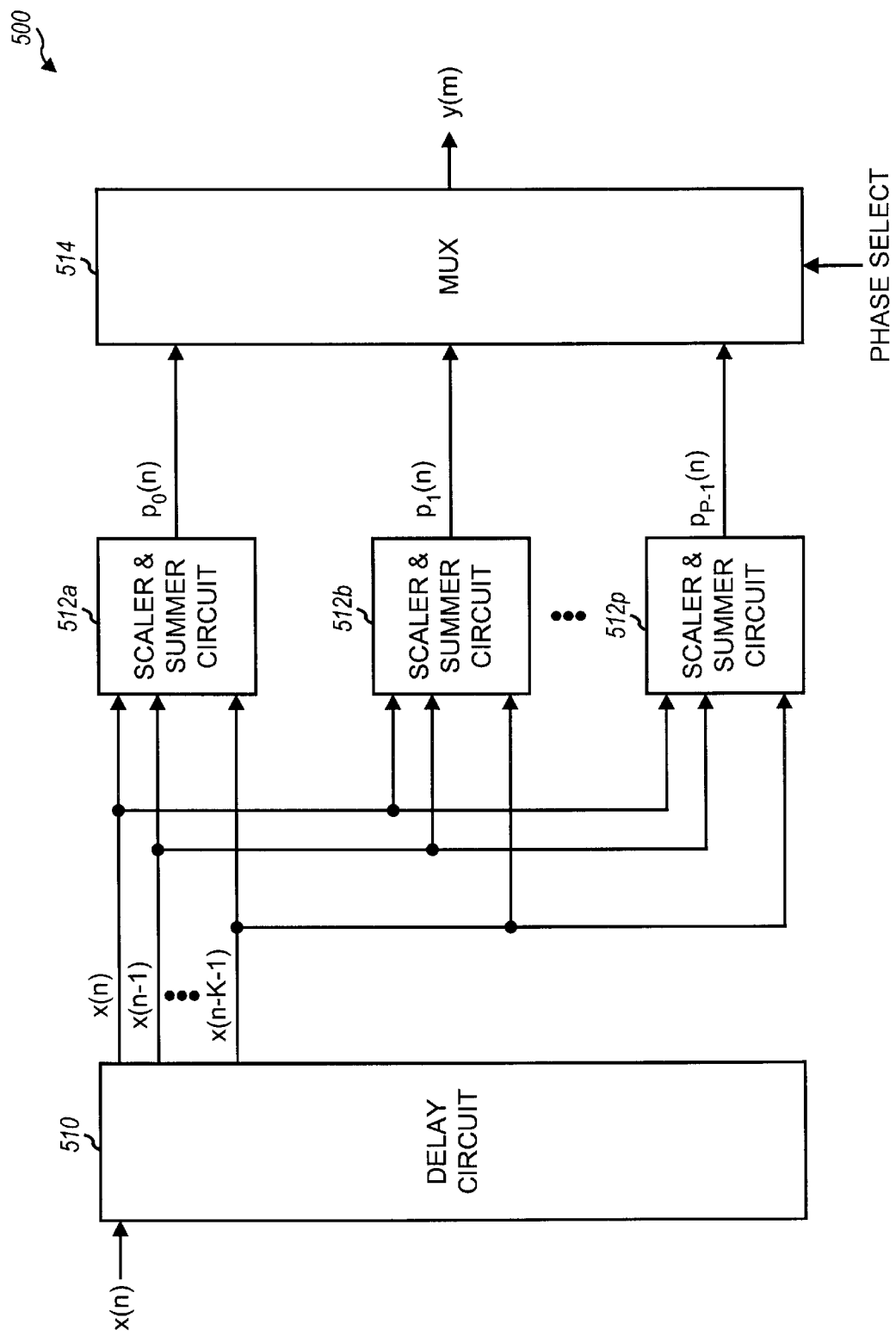
FIGS. 5 through 7 show block diagrams of three embodiments of sample rate converters that can be implemented with progressively less circuitry than the converter of FIG. 3.

FIG. 5 shows a block diagram of an embodiment of a sample rate converter 500 that can be implemented with less circuitry than that of FIG. 3. Sample rate converter 500 includes circuitry that concurrently computes P interpolated samples $p_0(n)$ through $p_7(n)$ for P phases $\phi_0$ through $\phi_7$, respectively. One of the interpolated samples is then selected, via a P-to-1 multiplexer, as the output sample y(m).

As shown in FIG. 5, the input samples x(n) are provided to a delay circuit 510 that delays the samples. The input and delayed samples are provided to a set of scaler and adder circuits 512a through 512p, one circuit for each of the P interpolated samples to be concurrently computed. Each circuit 512 receives and scales the input samples, and sums the scaled samples to generate the interpolated sample p(n).

Each circuit 512 implements one of the p(n) equations shown above. The interpolated samples $p_0(n)$ through $p_7(n)$ are provided to a MUX 514 that selects one of the interpolated samples, based on a phase select signal, as the output sample y(m). The phase select signal can be generated by a timing circuit based, for example, on the input and output sample rates, the input clock CKIN and the sample rate converter ratio, or other information.

Sample rate converter 500 in FIG. 5 includes P circuits 512 to concurrently compute P interpolated samples, or one circuit 512 for each of the P rows in Table 1. Sample rate converter 500 is effectively a direct implementation of Table 1. The implementation of circuit 512a requires three 2-input adders, the implementation of circuit 512b requires four 2-input adders, and so on. A total of thirty four 2-input adders is required to compute the eight interpolated samples.

Figure 6:
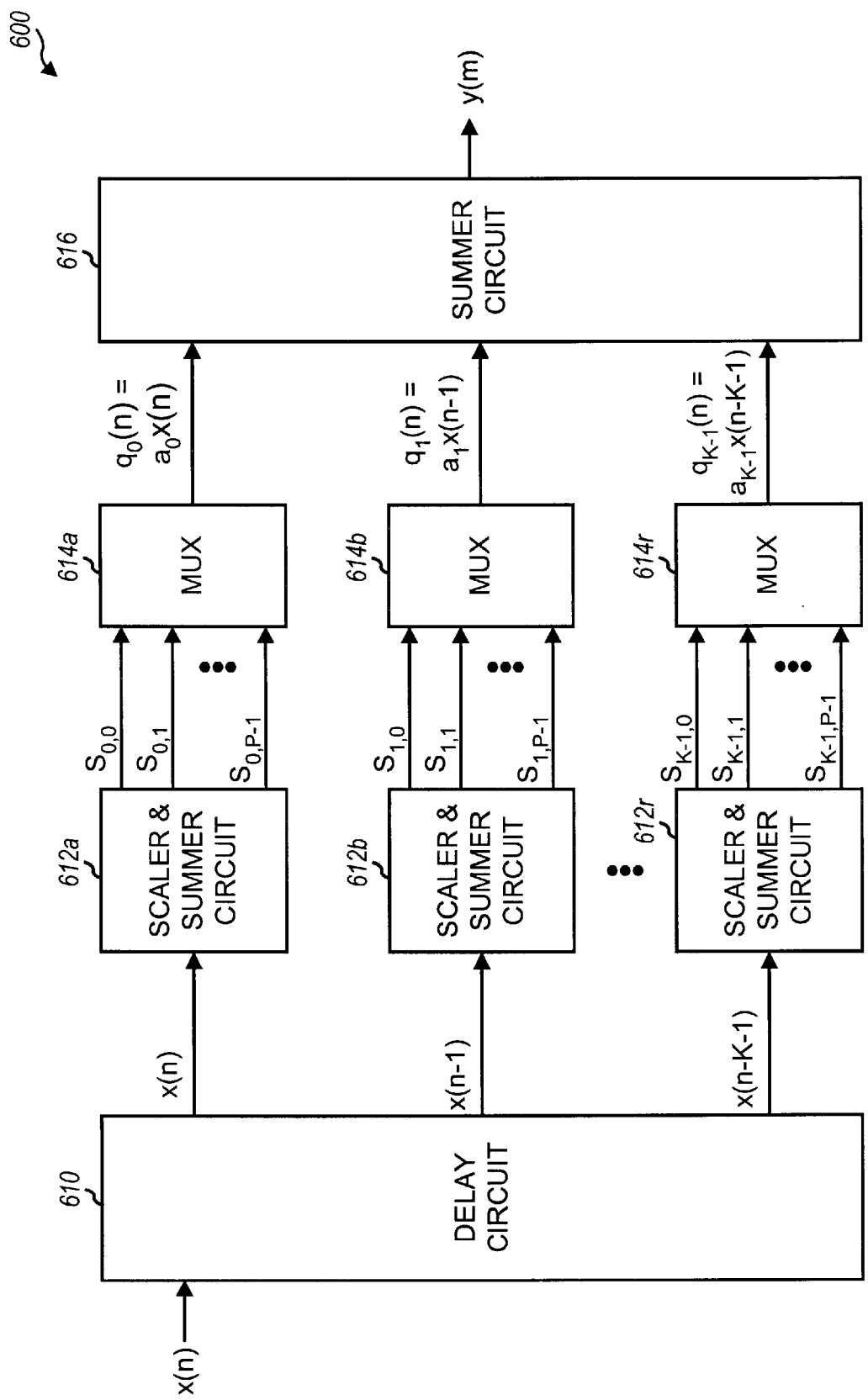

FIG. 6 shows a block diagram of an embodiment of a sample rate converter 600 that can be implemented with less circuitry than that of FIG. 5. When the number of taps of the sample rate converter is less than the number of phases (i.e. K<P), which is true for many sample rate converters, the sample rate converter can be further simplified by selecting the terms required for the desired interpolated sample prior to the summing. Referring back to Table 1, there are eight rows (P≦8) and four columns (K=4). Four multiplexers (one for each column) can be used to select the terms corresponding to the desired phase, and the selected terms can then be combined to generate the desired interpolated sample.

As shown in FIG. 6, a delay circuit 610 receives and delays the input samples x(n). The input and delayed samples x(n), x(n-1), x(n-2), and x(n-3) are provided to scaler and adder circuits 612a, 612b, 612c, and 612d, respectively. Each circuit 612 shifts and (if required) combines samples to generate a set of up to P intermediate terms s(n) that are provided to a respective MUX 614. Each MUX 614 receives the set of intermediate samples s(n) and a phase select signal (not shown in FIG. 6, for simplicity), selects the sample corresponding to the phase $\phi_0$, $\phi_1$, $\phi_2$, . . . or $\phi_7$ indicated by the phase select signal, and provides the selected sample to an adder circuit 616. Adder circuit 616 sums the received samples to generate the output sample y(m).

Referring back to Table 1, each circuit 612 generates up to eight terms for one column of the table. Each MUX 614 selects the term corresponding to the desired phase. Summing circuit 616 combines the selected terms from the four columns.

Table 2 lists the terms $s_{ij}(n)$ at the inputs of MUXes 614. For example, MUX 614b receives the term $12 \cdot x(n-1)$ at inputs 0, 1, and 2, the term $11 \cdot x(n-1)$ at input 3, the term $9 \cdot x(n-1)$ at input 4, the term $8 \cdot x(n-1)$ at input 5, the term $6 \cdot x(n-1)$ at input 6, and the term $4 \cdot x(n-1)$ at input 7.

TABLE 2

| | $s_{ij}(n)$ terms at the MUX inputs | | | |
|---|---|---|---|---|
| MUX input | MUX 614a | MUX 614b | MUX 614c | MUX 614d |
| 0 | 2•x(n) | 12•x(n-1) | 2•x(n-2) | |
| 1 | 1•x(n) | 12•x(n-1) | 4•x(n-2) | −1•x(n-3) |
| 2 | | 12•x(n-1) | 6•x(n-2) | −2•x(n-3) |
| 3 | −1•x(n) | 11•x(n-1) | 8•x(n-2) | −2•x(n-3) |
| 4 | −1•x(n) | 9•x(n-1) | 9•x(n-2) | −1•x(n-3) |
| 5 | −2•x(n) | 8•x(n-1) | 11•x(n-2) | −1•x(n-3) |
| 6 | −2•x(n) | 6•x(n-1) | 12•x(n-2) | |
| 7 | −1•x(n) | 4•x(n-1) | 12•x(n-2) | 1•x(n-3) |

As shown in Table 2, each MUX 614 receives terms associated with a particular time delay (e.g. x(n), x(n−1), and so on) but at various amplitudes. For example, MUX 614a receives the x(n) terms, MUX 614b receives the x(n−1) terms, MUX 614c receives the x(n−2) terms, and MUX 614d receives the x(n−3) terms. Each MUX 614 includes up to eight inputs, one input for each of the P phases. Depending on the desired phase, the term at one of the inputs is selected and provided to the output. For example, if the desired phase is $\phi_3$, the term at input 3 of each MUX 614 is provided to adder circuit 616, which would receive the terms −1·x(n), 11·x(n−1), 8·x(n−2), and −2·x(n−3). Adder 616 includes three 2-input adders to combine the four terms $q_0(n)$, $q_1(n)$, $q_2(n)$, and $q_3(n)$, where $q_0(n)=a_0 \cdot x(n)$, $q_1(n)=a_1 \cdot x(n-1)$, $q_2(n)=a_2 \cdot x(n-2)$, and $q_3(n)=a_3 \cdot x(n-3)$.

In Table 2, no adders are needed to generate the 2·x(n) and 1·x(n) terms for MUX 614a since these terms can be generated by simply bit-shifting the sample x(n). Two 2-input adders are used to generate the 11·x(n−1) terms for MUX 614b, two 2-input adders are used to generate the 11·x(n−2) terms for MUX 614c, and no adders are needed to generate the terms for MUX 614d. Overall, four 2-input adders are used to implement circuits 612 and three 2-input adders are used in adder circuit 616 to combine the $q_0(n)$ through $q_3(n)$ terms. Implementation of sample rate converter 600 thus requires seven 2-input adders, which is a substantial saving from the thirty four 2-input adders used to implement sample rate converter 500 in FIG. 5. Scaler and delay circuits 612 and MUXes 614 can typically be implemented using less hardware than that required to implement the twenty seven additional 2-input adders required by sample rate converter 500. Thus, sample rate converter 600 is a more efficient design.

In sample rate converter 600, each MUX 614 is assigned to a particular time delay (i.e., x(n), x(n−1), x(n−2), or x(n−3)). Consequently, some adders are provided prior to the MUXes to generate the required intermediate terms (e.g., 11·x(n−1)). Additional hardware saving can be achieved by moving these adders to the output of the MUXes.

Figure 7:
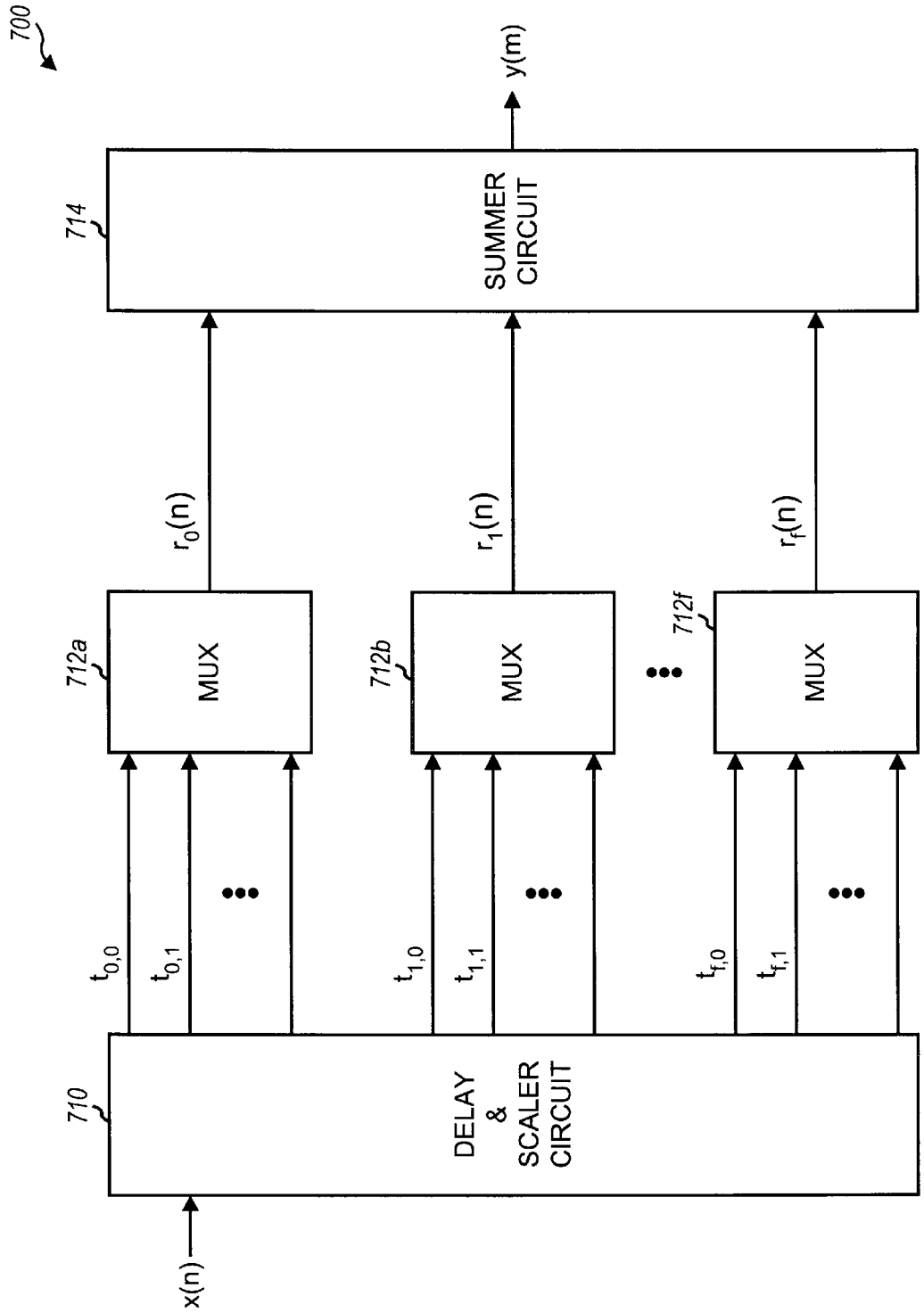

FIG. 7 shows a block diagram of an embodiment of a sample rate converter 700 that can be implemented with even less circuitry than that of FIG. 6. A delay and scaler circuit 710 receives, delays, and scales the input samples x(n). Again, the scaling can be achieved by bit-shifting the samples. Each of MUXes 712a through 712x receives a respective set of processed samples t(n) from circuit 710 and a phase select signal (not shown in FIG. 7, for simplicity). The processed samples t(n) are terms generated by scaling (if necessary) the samples x(n), x(n−1), and so on. However, no addition is used to generate the terms t(n). Each MUX 712 selects the processed sample corresponding to the phase indicated by the phase select signal, and provides the selected sample r(n) to an adder circuit 714. Adder circuit 714 combines the received samples $r_0(n)$ through $r_x(n)$ to generate the interpolated sampled that is provided as the output sample y(m).

The number of MUXes 712 required to implement sample rate converter 700 is determined by the maximum number of terms required to generate any one of the P interpolated samples. Referring to Table 1, six terms are used to generate the interpolated samples at phases $\phi_3$, $\phi_4$, and $\phi_5$ (as indicated by the use of five 2-input adders shown in the rightmost column of Table 1). Thus, sample rate converter 700 includes six MUXes 712. Each MUX 712 has up to P inputs.

Table 3 tabulates the terms at the inputs of each MUX 712 for sample rate converter 700. These terms can be generated by delaying the input sample x(n) (if required) and bit-shifting the sample. For each phase, MNXes 712a through 712f provide the required terms. For example, to generate the interpolate sample at phase $\phi_3$, the terms at input 3 of the MUXes are provided to summing circuit 714, which receive the terms −1·x(n), 8·x(n−1), 2·x(n−1), 1·x(n−1), 8·x(n−2), and −2·x(n−3) from MUXes 712a through 712f, respectively. The 8·x(n−1), 2·x(n−1), and 1·x(n−1) terms are components of, and used to generate, the 11·x(n−1) term.

TABLE 3

| MUX input | Inputs to MUXes 712a through 712f | | | | | |
|---|---|---|---|---|---|---|
| | MUX 712a | MUX 712b | MUX 712c | MUX 712d | MUX 712e | MUX 712f |
| 0 | 2 · x(n) | 8 · x(n − 1) | 4 · x(n − 1) | 2 · x(n − 2) | | |
| 1 | 1 · x(n) | 8 · x(n − 1) | 4 · x(n − 1) | 4 · x(n − 2) | −1 · x(n − 3) | |
| 2 | 8 · x(n − 1) | 4 · x(n − 1) | 4 · x(n − 2) | 2 · x(n − 2) | −2 · x(n − 3) | |
| 3 | −1 · x(n) | 8 · x(n − 1) | 2 · x(n − 1) | 1 · x(n − 1) | 8 · x(n − 2) | −2 · x(n − 3) |
| 4 | −1 · x(n) | 8 · x(n − 1) | 1 · x(n − 1) | 8 · x(n − 2) | 1 · x(n − 2) | −1 · x(n − 3) |
| 5 | −2 · x(n) | 8 · x(n − 1) | 8 · x(n − 2) | 2 · x(n − 2) | 1 · x(n − 2) | −1 · x(n − 3) |
| 6 | −2 · x(n) | 4 · x(n − 1) | 2 · x(n − 1) | 8 · x(n − 2) | 4 · x(n − 2) | |
| 7 | −1 · x(n) | 4 · x(n − 1) | 8 · x(n − 2) | 4 · x(n − 2) | 1 · x(n − 3) | |

As indicated in Table 3, a total of five 2-input adders are used to combine the terms from MUX 712a through MUX 712f, which is two fewer than the seven used to implement sample rate converter 600. Sample rate converter 700 uses two more MUXes than sample rate converter 600. However, these MUXes can typically be implemented using less hardware than required for adders, and the overall circuit is thus simplified. Generally, as the number of phases increases (i.e. as P increases), the additional simplification with sample rate converter 700 becomes more substantial.

Table 4 shows the generation of the terms in Table 3. The designation "<<x" indicates a bit-shift operation to the left by x bits.

TABLE 4

| MUX input | Inputs to MUXes 712a through 712f | | | | | |
|---|---|---|---|---|---|---|
| | MUX 712a | MUX 712b | MUX 712c | MUX 712d | MUX 712e | MUX 712f |
| 0 | x(n) << 1 | x(n − 1) << 3 | x(n − 1) << 2 | x(n − 2) << 1 | | |
| 1 | x(n) << 0 | x(n − 1) << 3 | x(n − 1) << 2 | x(n − 2) << 2 | x(n − 3) << 0 | |
| 2 | x(n − 1) << 3 | x(n − 1) << 2 | x(n − 2) << 2 | x(n − 2) << 1 | x(n − 3) << 1 | |
| 3 | x(n) << 0 | x(n − 1) << 3 | x(n − 1) << 1 | x(n − 1) << 0 | x(n − 2) << 3 | x(n − 3) << 0 |
| 4 | x(n) << 0 | x(n − 1) << 3 | x(n − 1) << 0 | x(n − 2) << 3 | x(n − 2) << 0 | x(n − 3) << 0 |
| 5 | x(n) << 1 | x(n − 1) << 3 | x(n − 2) << 3 | x(n − 2) << 1 | x(n − 2) << 0 | x(n − 3) << 0 |
| 6 | x(n) << 1 | x(n − 1) << 2 | x(n − 1) << 1 | x(n − 2) << 3 | x(n − 2) << 2 | |
| 7 | x(n) << 0 | x(n − 1) << 2 | x(n − 2) << 3 | x(n − 2) << 2 | x(n − 3) << 0 | |

The sample rate converters of the invention can be used to generate output samples at an output sample rate that is different than that of the received samples. Generally, the output sample rate $f_{OUT}$ is less than the input sample rate $f_{IN}$ (i.e. $f_{OUT}<f_{IN}$). However, it may be possible to generate output samples having a higher sample rate by first upconverting the input samples (e.g. using a zero fill or other techniques).

The sample rate converters described above can be implemented in various manners—in hardware or software or a combination thereof. For example, a sample rate converter can be implemented within an application specific integrated circuits (ASIC), a processor, a digital signal processor, and other devices. The sample rate converter can also be implemented with custom circuitry, look-up tables, and other circuits.

The sample rate converters of the invention can be used in various applications. Some of these applications include digital video and audio processing, modem (e.g., satellite, cable), digital signal processing, and others.

The invention as used in a video decoder is described below. For simplicity, the invention is described, to a large extent, in conjunction with the NTSC standard and the luminance and chrominance components (Y and C). However, the invention can be applied to other standards including PAL and SECAM. In addition, the invention can be used with other video components.

Figure 8:
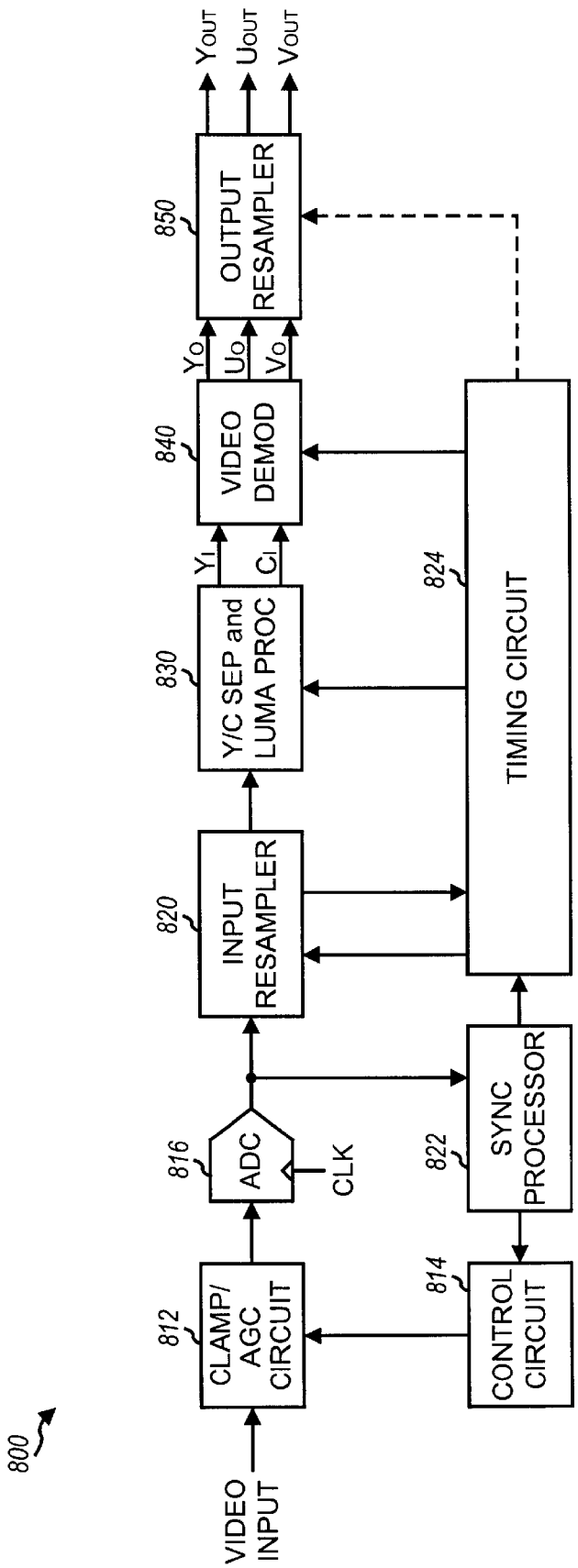
FIG. 8 shows a simplified block diagram of an embodiment of a video decoder.

FIG. 8 shows a simplified block diagram of an embodiment of a video decoder 800. As shown in FIG. 8, the composite video input signal is provided to a clamp/AGC (automatic gain control) circuit 812 that clamps and scales the signal in accordance with a set of control signals from a control circuit 814. The clamped and AGCed signal is provided to an analog-to-digital converter (ADC) 816 that samples the signal with a clock signal CLK having a particular sampling frequency $f_{SAMP}$. The video samples are provided to an input resampler 820 and a sync processor 822.

Resampler 820 resamples the video samples with a first resampling signal from a timing circuit 824 and provides the resampled video samples to a Y/C separator and luminance processor (Y/C SEP and LUMA PROC) 830. Resampling and generation of the signals used for resampling are described in the aforementioned U.S. patent application Ser. No. 09/387,389. The resampled video samples are composite video samples that include both luminance (Y) and chrominance (C) components. Y/C separator and luminance processor 830 separates the luminance and chrominance components from the composite samples, and provides the separated components ($Y_I$ and $C_I$) to a video demodulator (DEMOD) 840. Demodulator 840 further processes the luminance component ($Y_I$), demodulates the chrominance component ($C_I$) into color difference components (e.g., U and V, or I and Q), and provides the processed components (e.g., $Y_O$, $U_O$, and $V_O$) to an output resampler 850. Resampler 850 resamples the components with a second resampling signal from timing circuit 824, as described in the aforementioned U.S. patent application Ser. No. 09/387,389. The resampled components from resampler 850 comprise the output components $Y_{OUT}$, $U_{OUT}$, and $V_{OUT}$. Resamplers 820 and 850 can each be implemented using any of the sample rate converters described above. Some of the elements in FIG. 8 are described in further detail below.

In FIG. 8, clamping and scaling are performed on the composite video input signal to provide a processed signal having a proper amplitude and DC level for sampling by ADC 816. This processing ensures that the video signal is not clipped by the ADC. In an embodiment, clamping is achieved by adding an offset (e.g., an offset voltage) to the input video signal such that the blanking level of the clamped video signal is maintained at a first particular level. In an embodiment, AGC is achieved by scaling the clamped video signal such that the sync tip is maintained at a second particular level. Control circuit 814 generates the control signals used for clamping and scaling. Clamping and scaling can also be performed using other techniques, as is known in the art.

In a specific embodiment, the processed video signal is sampled by ADC 816 with a sampling clock having a fixed frequency $f_{SAMP}$. The sampling frequency $f_{SAMP}$ is selected to satisfy the Nyquist criterion, and is at least twice the bandwidth of the processed video signal. In a specific implementation, the sampling frequency is set at approximately 27.0 MHz, although other frequencies can also be used. The sampling frequency can be asynchronous with the line and subcarrier frequencies. For improved decoding performance, the sampling clock is derived from a stable clock source (e.g., a voltage controlled crystal oscillator (VCXO), a PLL locked to a stable clock, or other sources) to provide low-jitter video samples for standard and non-standard input video signals.

Sync processor 822 detects the horizontal and vertical synchronizing pulses in the video signal and generates horizontal and vertical (H/V) sync signals indicative of the detected sync pulses. These sync signals are used by other circuits for timing, synchronization, and control, as described below. An implementation of sync processor is described in the aforementioned U.S. patent application Ser. No. 09/387,389.

Figures 9A, 9B:
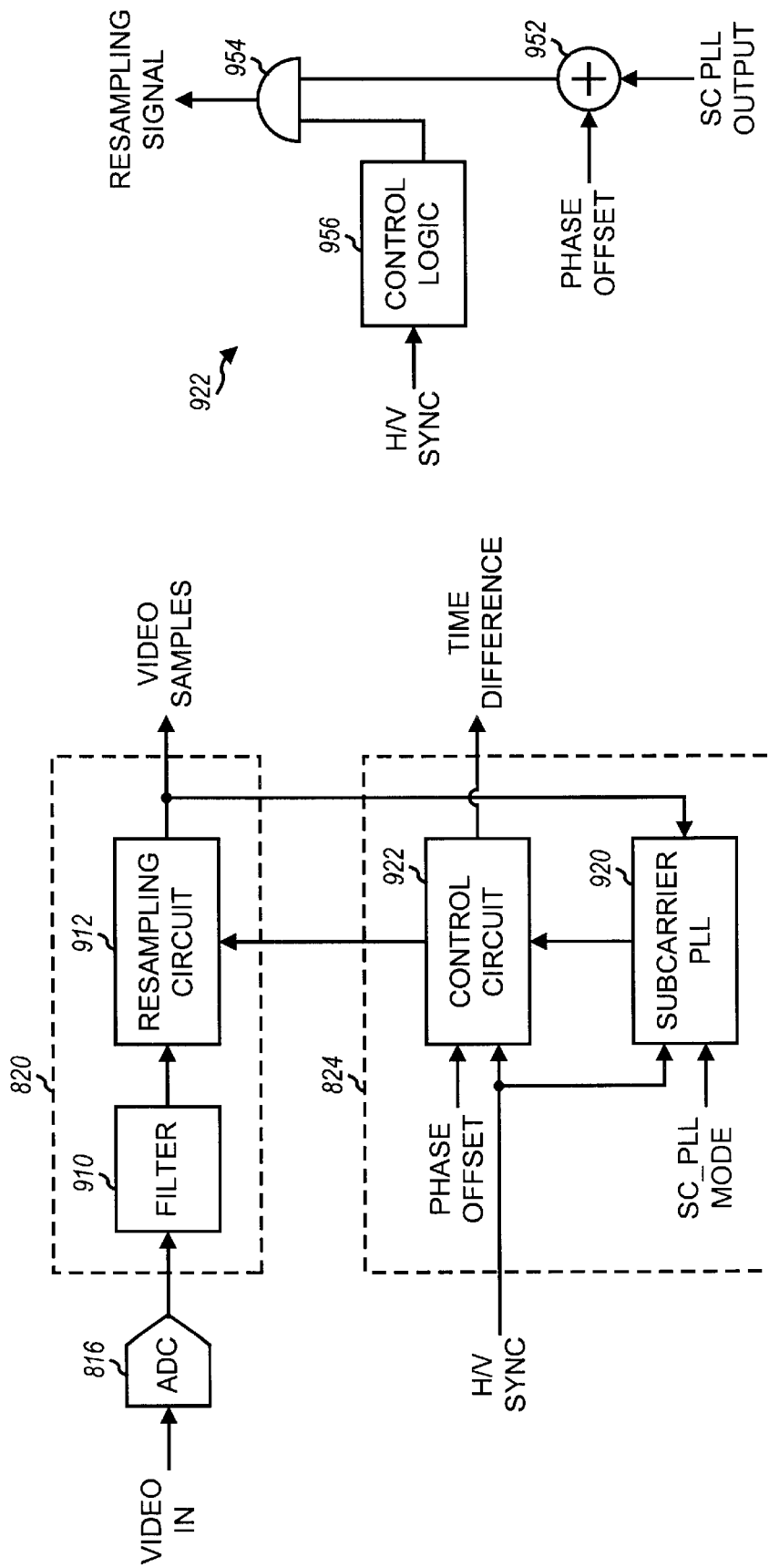
FIG. 9A shows a simplified block diagram of an embodiment of an input resampler.
FIG. 9B shows a block diagram of an embodiment of a section of a control circuit that generates the resampling signal.

FIG. 9A shows a simplified block diagram of an embodiment of input resampler 820. Resampler 820 receives video samples at the sample rate $f_{SAMP}$ and generates resampled video samples at a first resampled rate $f_{R1}$. In an embodiment, the resampling frequency $f_{R1}$ is related to the subcarrier frequency, or $f_{R1}=m \cdot f_{SC}$, where m is an integer greater than two. By selecting a resampling frequency that is related to the subcarrier frequency by an integer, the resampled video samples can be more easily demodulated, as described below. Color demodulation is simplified when m is an even integer, and is preferably four. Input resampler 820 effectively implements a burst-lock front end for the video decoder.

As shown in FIG. 9A, the video samples from ADC 816 are provided to an (optional) anti-aliasing filter 910 within resampler 820. Filter 910 is a lowpass filter that removes high frequency components to prevent aliasing during resampling. The video samples include spectral components from DC to $0.5 \cdot f_{SAMP}$. When the resampling frequency is lower than the sampling frequency, the higher spectral components alias and fold inband during resampling. For example, if the resampling frequency is four times the subcarrier frequency, or $f_{R1}=4f_{SC}=14.318$ MHz, and the sampling frequency $f_{SAMP}=27.0$ MHz, the spectral portion from 7.159 MHz to 13.5 MHz aliases during resampling. This spectral portion would constitute noise in the resampled video signal. Filter 910 removes the spectral portion that can alias during resampling, and its bandwidth BW is selected based, in part, on the resampling frequency, or $BW<f_{R1}/2$.

The filtered samples are provided to a resampling circuit 912. In a specific embodiment, resampling circuit 912 is a 2-tap sample rate converter that generates (or interpolates) samples at the resampling rate $f_{R1}$. Each interpolated sample y[i] is based on two filtered samples x[i] and x[i+1] and a phase difference k[n] between the resampling signal and the ADC sampling clock for that particular sample y[i]. Resampling circuit 912 can also be implemented using 3-tap and more taps interpolators, or with other resampling architectures, and this is within the scope of the invention.

Linear (2-tap) and higher order (3-tap and more) interpolation is further described in two papers entitled "Interpolation in Digital Modems—Part I: Fundamentals," by Floyd M Gardner, IEEE Transactions on Communications, Vol. 41, No. 6, June 1993, and "Interpolation in Digital Modems—Part II: Implementation and Performance," by Floyd M Gardner, IEEE Transactions on Communications, Vol. 41, No. 3, March 1993, both of which are incorporated herein by reference. A graphical description of the resampling process is included in the aforementioned U.S. patent application Ser. No. 09/387,389.

A subcarrier PLL 920 generates a timing signal used for resampling. PLL 920 receives the horizontal and vertical sync signals (H/V SYNC) from sync processor 822 and the resampled video samples from resampling circuit 912. In an embodiment, PLL 920 includes a numerically controlled oscillator (NCO) that generates a synthesized clock signal based, in part, on a stable clock signal (e.g., the ADC sampling clock CLK). The frequency of the clock signal from PLL 920 is phased locked to the color bursts in the input video signal. Implementation of PLL 920 is further described below.

The H/V SYNC signals are used by PLL 920 to generate windows during which detection of color bursts is enabled. As noted above, the color burst typically begins a particular time period after the falling edge of the horizontal sync signal. The H/V SYNC signals are also used by PLL 920 to enable the PLL during time intervals when valid color bursts are detected.

A control circuit 922 provides the resampling signal to resampling circuit 912. The resampling signal is dependent on the timing signal from PLL 920, and may be further dependent on a phase offset value (e.g., provided by the user). The phase offset value allows the user to change the tint of the decoded picture. For an embodiment in which the resampling circuit is implemented with an interpolator, the resampling signal determines the weighting factor for each of the samples used to generate the interpolated (or resampled) sample.

FIG. 9B shows a block diagram of an embodiment of a section of control circuit 922 that generates the resampling signal. An adder 952 receives the output from PLL 920 and the phase offset value, combines the two received inputs, and provides the result to one input of an AND gate 954. In an embodiment, a control logic 956 receives the H/V SYNC signals, generates a window that is logic high for the duration of each active video line except during the sync pulse, and provides the window to the other input of AND gate 954. AND gate 954 generates the resampling signal based on the two inputs. Thus, in an embodiment, the color bursts and active video portion, but not the sync pulse, are resampled. This feature can be particularly advantageous for providing 1024 samples (instead of 1135 samples) for each PAL video line, which can reduce the memory requirement to 1 Kbyte for each active video line.

In an embodiment, control circuit 922 further includes circuitry (not shown in FIG. 9B) that computes, for each active video line, a time difference between the start of the video line (e.g., which is defined as the falling edge of the horizontal sync pulse) and the color burst phase. The color burst phase can be determined as the phase of the first resampled video sample in the video line after the falling edge of the horizontal sync pulse, as described in the aforementioned U.S. patent application Ser. No. 09/387,389. This time difference represents the misalignment in the picture, which is typically more pronounced for a non-standard video signal. The time difference is provided to output resampler 850 for adjustment and alignment of the picture.

The circuitry used to implement input resampler 820 is known in the art and not described in detail herein. In actual circuit implementations, the resampling signal is typically synthesized from another clock signal (e.g., the ADC clock signal CLK). The ADC clock signal may thus be used to provide both the ADC samples and the resampled video samples. Since the resampling frequency is typically less than the ADC sampling frequency ($f_{R1}<f_{SAMP}$), some periods of the clock signal CLK will not be associated with valid resampled video samples. The circuit implementation details to process samples at "virtual" resampling rates based another clock signal (e.g., the ADC clock signal CLK) are known in the art and not described herein.

The resampled video samples from input resampler 820 are "composite" samples that include both luminance (Y) and chrominance (C) components. Y/C separator and luminance processor 830 receives and separates the composite samples into luminance and chrominance samples.

Figure 10A:
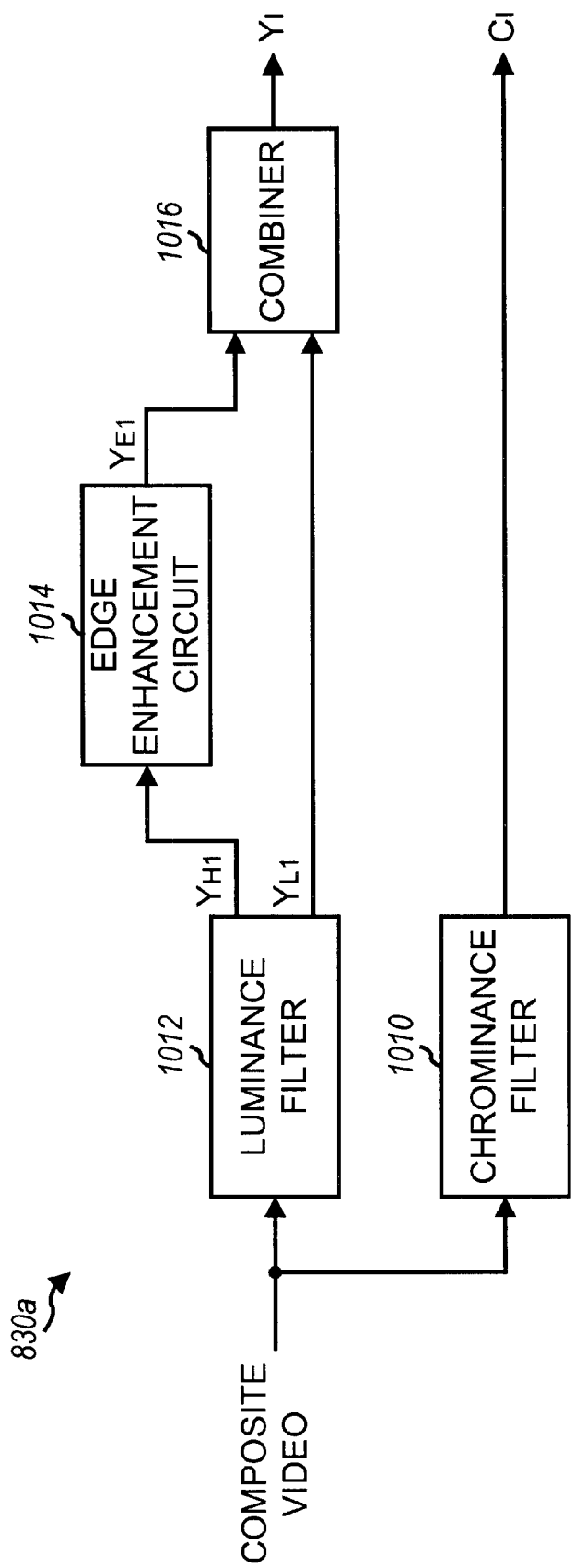
FIGS. 10A and 10B show simplified block diagrams of two specific embodiments of a Y/C separator and luminance processor.

FIG. 10A shows a simplified block diagram of a specific embodiment of a Y/C separator and luminance processor 830a. The composite video signal (i.e., the resampled video samples) is provided to a chrominance filter 1010 and a luminance filter 1012. Chrominance filter 1010 extracts the chrominance signal $C_I$ from the composite video signal, as described below.

Luminance filter 1012 performs several functions to assist in the generation of an output luminance signal $Y_I$ having enhanced edges. Luminance filter 1012 extracts the luminance signal $Y_C$ from the composite video signal S1, as described below. Luminance filter 1012 also filters the composite video signal and provides a lowpass filtered signal $Y_{L1}$ to a combiner 1016. Luminance filter 1012 further detects edges in the composite video signal and provides a signal $Y_{H1}$ indicative of the detected edges. In a specific embodiment, the signal $Y_{H1}$ is generated by subtracting the lowpass signal $Y_{L1}$ from the extracted luminance signal $Y_C$ (i.e., $Y_{H1}=Y_C-Y_{L1}$). The signal $Y_{H1}$ is provided to an edge enhancement circuit 1014 that enhances the detected edges in the luminance signal and provides a signal $Y_{E1}$ indicative of the enhanced edges. In an embodiment, the signal $Y_{E1}$ is a non-linear function of the signal $Y_{H1}$, or is dynamically generated based on characteristics of the detected edges, as described in further detail below. The signal $Y_{E1}$ is provided to combiner 1016 and combined with the lowpass signal $Y_{L1}$ to provide the output luminance signal $Y_I$ having enhanced edges. Each of the elements shown in FIG. 10A is described in further detail below.

Luminance filter 1012 provides the appropriate filtering to remove the chrominance component from the composite video signal. The signal $Y_{L1}$ tends to include low frequency components, and the signal $Y_{H1}$ tends to include high frequency components.

Figure 10B:
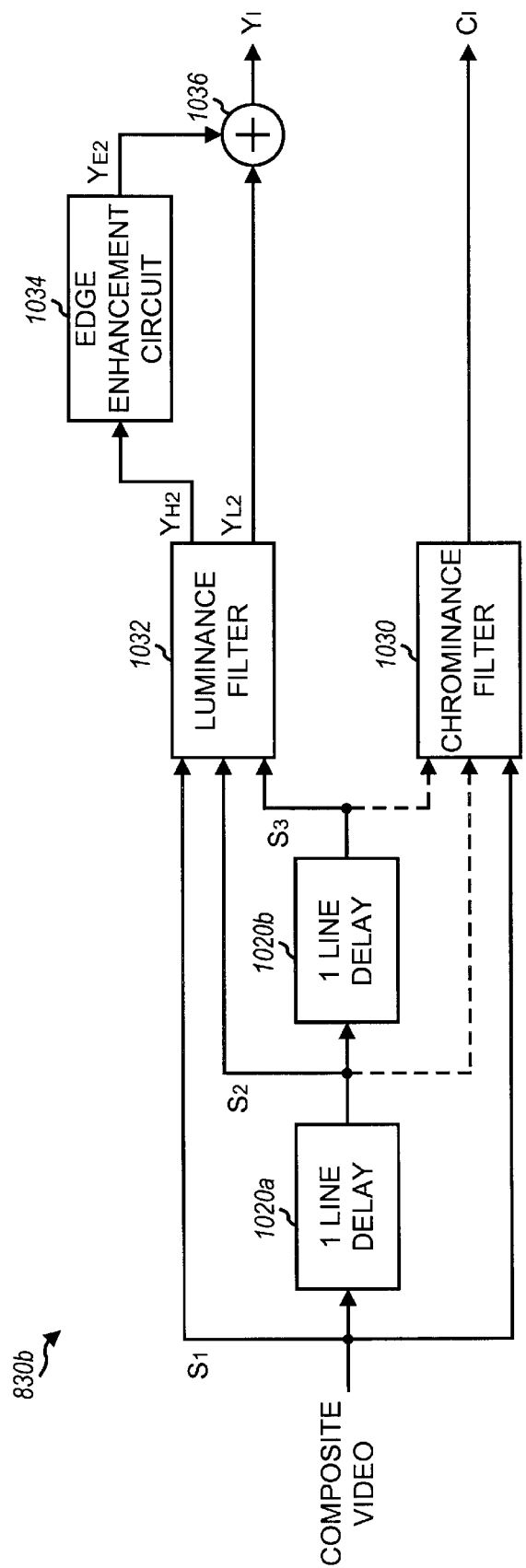

FIG. 10B shows a simplified block diagram of a specific embodiment of a Y/C separator and luminance processor 830b. The composite video signal is provided to a delay element 1020a and further to a delay element 1020b. Each delay element 1020 provides one horizontal line of delay which, in an embodiment, is a variable amount of delay for non-standard video signals. In an embodiment, the amount of delay is approximately (m·n+m/2) samples for NTSC decoding and (m·n+3m/4) samples for PAL decoding, with m and n being integers selected in a manner described below. In a specific embodiment, for an NTSC signal that is sampled at four times the subcarrier frequency, m=4, n=227, and delay element 1020 provides (4n+2) samples of delay. The composite video signal and the delayed signals from delay elements 1020a and 1020b (comprising the video signals S1, S2, and S3, respectively, as shown in FIG. 10B) are provided to a luminance filter 1032. The composite video signal is also provided to a chrominance filter 1030, which may also receive the signals S2 and S3, depending on the particular implementation of the chrominance filter. Chrominance filter 1030 extracts the chrominance signal $C_I$ from the composite video signal.

Luminance filter 1032 extracts the luminance signal $Y_C$ from the composite video signal. In an embodiment, luminance filter 1032 includes a 2-dimensional (2-D) lowpass filter that performs two-dimensional filtering of the composite video signal and provides a lowpass filtered signal $Y_{L2}$ to an adder 1036. Luminance filter 1032 also detects edges in the composite video signal and provides a signal $Y_{H2}$ indicative of the detected edges. In a specific embodiment, the signal $Y_{H2}$ is generated by subtracting the lowpass signal $Y_{L2}$ from the extracted luminance signal $Y_C$ (i.e., $Y_{H2}=Y_C-Y_{L2}$).

The signal $Y_{H2}$ is provided to an edge enhancement circuit 1034 that enhances the detected edges in the luminance signal and provides a signal $Y_{E2}$ indicative of the enhanced edges to adder 1036. In an embodiment, the signal $Y_{E2}$ is a non-linear function of the signal $Y_{H2}$, or is dynamically generated based on characteristics of the detected edges, as described in further detail below. Adder 1036 combines the lowpass signal $Y_{L2}$ with the signal $Y_{E2}$ to provide an output luminance signal $Y_I$ having enhanced edges. Chrominance filter 1030, luminance filter 1032, and edge enhancement circuit 1034 are described in further detail below.

Figure 11:
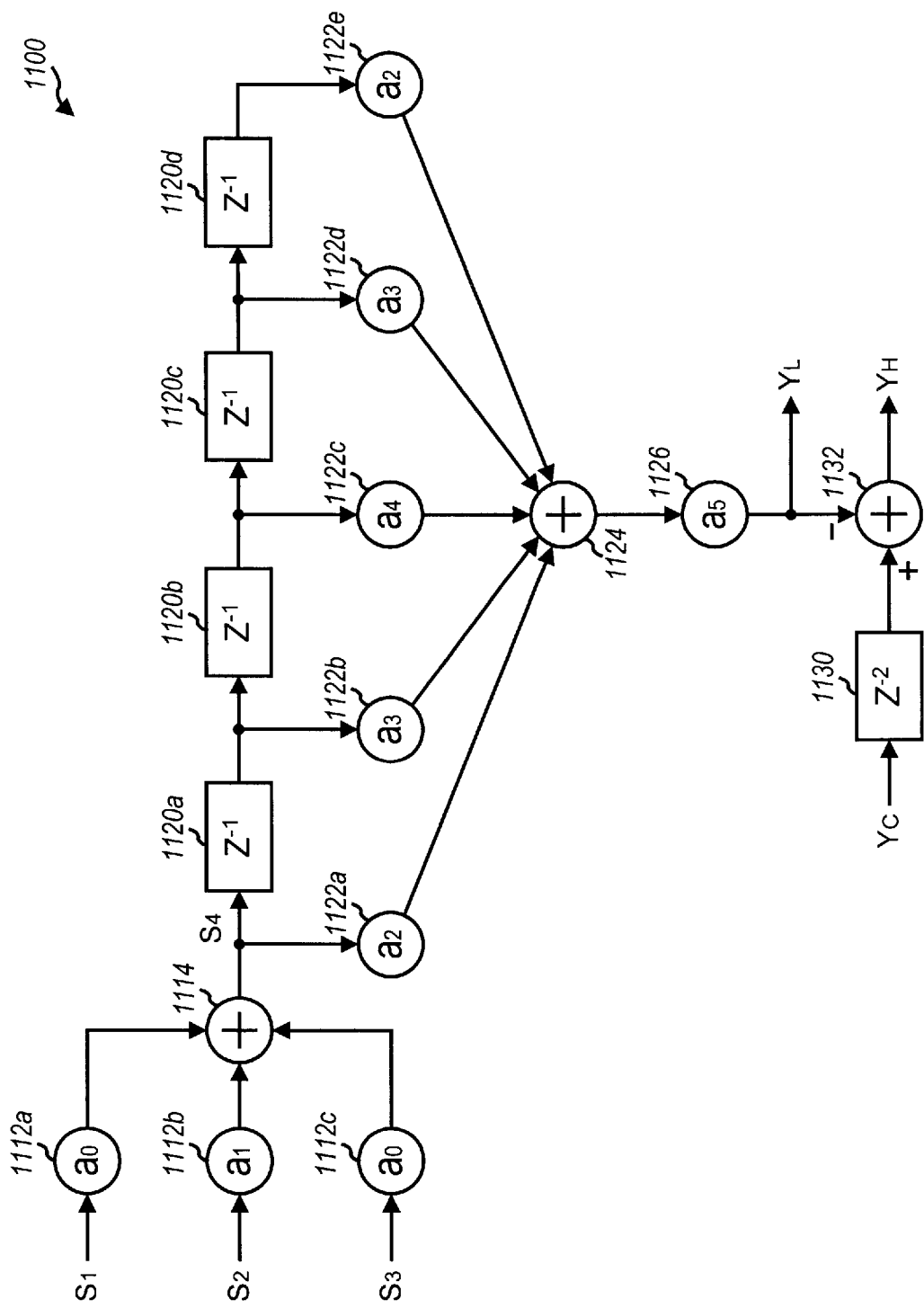
FIG. 11 shows a diagram of a specific embodiment of a luminance filter.

FIG. 11 shows a diagram of a specific embodiment of a 2-D lowpass filter 1100 that can be used to implement luminance filter 1012 in FIG. 10A and luminance filter 1032 in FIG. 10B. The video signals S1, S2, and S3 are provided to scaling elements 1112a, 1112b, and 1112c, respectively. Each scaling element 1112 scales the respective input signal by a gain factor (e.g., $a_0$ or $a_1$) and provides the scaled signal to an adder 1114. Adder 1114 sums the three input signals and provides the combined signal S4 to a delay element 1120a that further couples in series with delay elements 1120b, 1120c, and 1120d. Each delay element 1120 provides a delay of one sample, as denoted by the designation $Z^{-1}$. For a video signal that has been resampled to a new resampling frequency $f_{R1}$, each delay element 1120 provides a delay of $T_{R1}$, where $T_{R1}=1/f_{R1}$.

The signals from adder 1114 and delay elements 1120a through 1120d are provided to scaling elements 1122a through 1122e, respectively. Each scaling element 1122 scales the respective input signal with a respective gain factor (e.g., $a_2$, $a_3$, or $a_4$) and provides the scaled signal to an adder 1124. Adder 1124 sums the five input signals and provides the combined signal to a scaling element 1126. Scaling element 1126 scales the input signal with a gain factor $a_5$ and provides the lowpass signal $Y_L$.

The signals S1, S2, and S3 represent signals from three consecutive lines of video (e.g., the composite video signal). Thus, scaling elements 1112a through 1112c and adder 1114 comprise a three tap finite impulse response (FIR) filter for the vertical direction of the video. Delay elements 1120, scaling elements 1122, and adder 1124 comprise a five tap FIR filter for the horizontal direction. Scaling element 1126 scales the filtered signal such that the overall filter gain is maintained at 1.0.

The extracted luminance signal $Y_C$ is also provided to a delay element 1130 that provides two samples of delay, to match the delay of the lowpass signal $Y_L$. The delayed signal from delay element 1130 is provided to an adder 1132, which subtracts from the lowpass signal $Y_L$ from the delayed signal to provide the signal $Y_H$ indicative of the detected edge.

In a specific embodiment, for ease of implementation, the gain factors $a_0$ and $a_2$ are selected to be one-half, the gain factors $a_1$, $a_3$, and $a_4$ are selected to be one, and the gain factor $a_5$ is selected to be one-eight. With these coefficients, 2-D lowpass filter 1100 has the following transfer function:

$$\frac{\begin{array}{|c|c|c|c|c|}\hline 1/4 & 1/2 & 1/2 & 1/2 & 1/4 \\ \hline 1/2 & 1 & 1 & 1 & 1/2 \\ \hline 1/4 & 1/2 & 1/2 & 1/2 & 1/4 \\ \hline \end{array}}{8}$$

Referring back to FIG. 10B, luminance filter 1032 receives the composite video signal S1 and its delayed versions S2 and S3. In an embodiment, each delay element 1020 provides a variable amount of delay such that the chrominance signals on alternate video lines are 180 degrees out-of-phase. Thus, the taps of the vertical FIR filter (e.g., $a_0$ and $a_1$) are selected such that the vertical chrominance component approximately cancels out, leaving the filtered vertical luminance component. For a composite video signal that has been resampled at four times the color subcarrier frequency, alternate samples within a particular video line are 180 degrees out-of-phase. The taps of the horizontal FIR filter (e.g., $a_2$, $a_3$, and $a_4$) are selected such that the horizontal chrominance component approximately cancels out, leaving the filtered horizontal luminance component.

As shown in FIG. 11, for simplicity, 2-D lowpass filter 1100 is implemented as a "decomposable" 2-D filter composed of a vertical lowpass filter followed by a horizontal lowpass filter. The decomposable filter simplifies the design, reduces the hardware requirement (e.g., the number of required gates), and also reduces the number of computations.

In general, 2-D lowpass filter 1100 can be designed using various filter topologies and various filter orders. 2-D lowpass filter 1100 can be implemented as an M×N filter, where M and N represent the filter orders in the vertical and horizontal directions, respectively, and M and N can each be a value of one or greater. For example, M can be 1, 2, 4, 5, or greater, and N can be greater or less than 5. 2-D lowpass filter 1100 can also be implemented using an infinite impulse response (IIR) filter, or other filter topologies.

In accordance with the NTSC standard, the color subcarrier frequency $f_{SC}$ (NTSC) is related to the line frequency $f_H$ by the following:

$$f_{SC}(NTSC)=227.5 f_H \text{ or } 4 f_{SC}=910 f_H. \qquad \text{Eq. (2)}$$

As shown by the first half of equation (2), for an NTSC-compliant video signal, there are 227.5 color burst cycles per horizontal line, and the color bursts are 180° out-of-phase between consecutive video lines. Thus, by delaying the samples by one video line and adding samples of the current line with the delayed samples of an immediately preceding line, the chrominance component approximately cancels out and the luminance component is obtained. Similarly, by subtracting samples of the current line from delayed samples of the immediately preceding line, the luminance approximately cancels out and the chrominance component is obtained.

In accordance with the PAL standard, the color subcarrier frequency $f_{SC}$ (PAL) is related to the line frequency $f_H$ by the following:

$$f_{SC}(PAL)=283.75 f_H \text{ or } 4 f_{SC}=1135 f_H. \qquad \text{Eq. (3)}$$

As shown by the first half of equation (3), for a PAL-compliant video signal, there are 283.75 color burst cycles per horizontal line, and the color bursts are 90° out-of-phase between consecutive video lines. Thus, by delaying the samples by one video line and plus-or-minus one sample period, and adding samples of the current line with the appropriately delayed samples of an immediately preceding line, the chrominance component approximately cancels out and the luminance component is obtained. Similarly, by subtracting samples of the current line from the appropriately delayed samples of the immediately preceding line, the luminance approximately cancels out and the chrominance component is obtained.

Figure 12A:
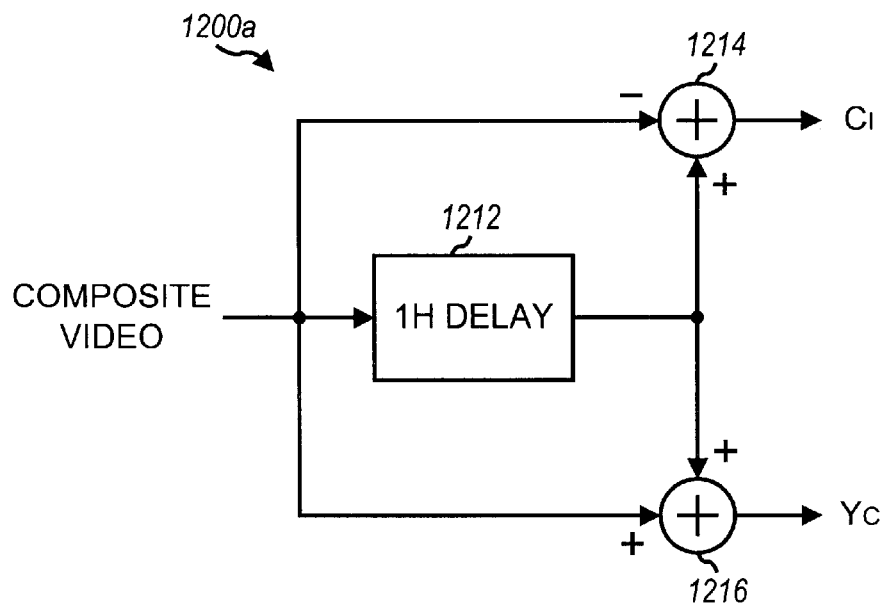
FIGS. 12A through 12C show block diagrams of three embodiment of a comb filter that can be used for Y/C separation.

FIG. 12A shows a block diagram of an embodiment of a comb filter 1200a that can be used for Y/C separation. The composite video signal (i.e., the signal S1) is provided to a delay element 1212 and adders 1214 and 1216. Delay element 1212 provides one horizontal line of delay which, in this embodiment, is a fixed number of samples or a fixed time period. For example, for an NTSC-compliant signal that is sampled at four times the subcarrier frequency, delay element 1212 provides 910 samples of delay. The composite video signal is subtracted from the delayed signal by adder 1214 to provide the chrominance signal $C_I$, and the composite video signal is added to the delayed signal by adder 1216 to provide the luminance signal $Y_C$.

As noted above, for non-standard video signals such as those from VCRs, the line duration can vary from line to line. When the video line is sampled with a burst-lock architecture, such as that performed by input resampler 120, each non-standard video line can include any number of samples.

Figure 12B:
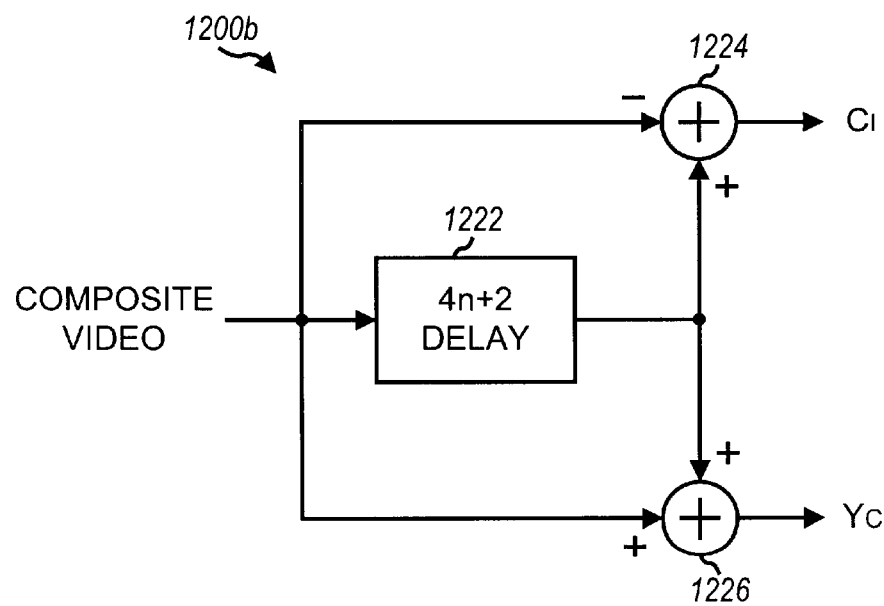

FIG. 12B shows a block diagram of an embodiment of a comb filter 1200b that can also be used for Y/C separation. The composite video signal (i.e., the signal S1) is provided to a delay element 1222 and adders 1224 and 1226. For NTSC decoding, delay element 1222 provides (m·n+m/2) samples of delay, where m is the ratio of the frequencies of the resampling signal and the color subcarrier (i.e., $m=f_{R1}/f_{SC}$) and n is an integer. In an embodiment, for an NTSC-compliant signal that is sampled at four times the subcarrier frequency, m=4, n=227, and delay element 1222 provides (4n+2) or 910 samples of delay. However, when decoding a non-standard video signal, n is selected to be an integer such that (m·n+m/2) most approximates the duration of the line. The line duration can be determined from the detected horizontal sync pulse at the start of each video line.

For PAL decoding, delay element 1222 provides (m·n+3m/4) samples of delay. In an embodiment, for a PAL-compliant signal that is sampled at four times the subcarrier frequency, m=4, n=283, and delay element 1222 provides (4n+3) or 1135 samples of delay.

Comb filter 1200b can provide a better approximation of the luminance and chrominance components for non-standard video signals than comb filter 1200a. Comb filter 1200b provides a variable amount of delay that is based on the actual duration of the video line. The delay provided by comb filter 1200b has at most ±2 samples of error from the actual video line length, and this error can be much less than that of a comb filter having a fixed number of samples of delay. Since most non-standard video signals have line duration that varies slowly from line to line, the ±2 samples of error is tolerable, or not objectionable, in most instances.

Figure 12C:
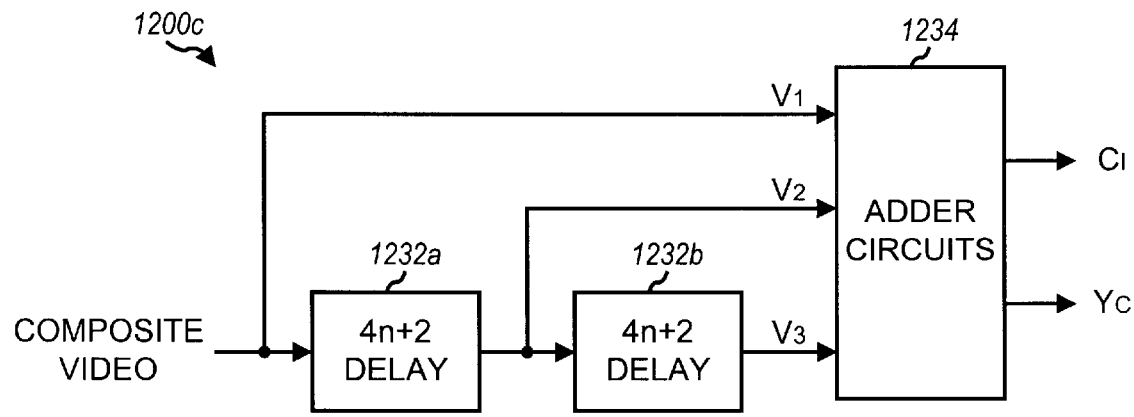

FIG. 12C shows a block diagram of an embodiment of an adaptive comb filter 1200c that provides improved performance for Y/C separation. Adaptive comb filter 1200c includes delay elements 1232a and 1232b having variable amounts of delay. The composite video signal is provided to delay element 1232a and further to delay element 1232b. In an embodiment, each delay element 1232 provides (m·n+m/2) samples of delay for NTSC decoding and (m·n+3m/4) samples of delay for PAL decoding, with m and n being integers selected in similar manner as for comb filter 1200b. For an NTSC signal that is sampled at four times the subcarrier frequency, m=4, n=227, and each delay element 1232 provides (4n+2) samples of delay. The composite video signal and the delayed signals from delay elements 1232a and 1232b (comprising the video signals V1, V2, and V3, respectively) are provided to adder circuits 1234 that appropriately combine the signals to generate the luminance signal $Y_C$ and the chrominance signal $C_I$.

Figure 12D:
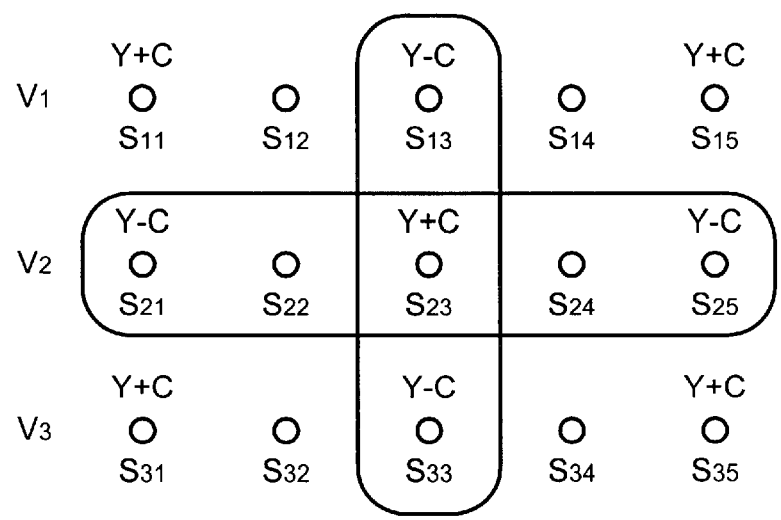
FIG. 12D shows a representation of the samples from the video signals V1, V2, and V3 used by the adaptive comb filter in FIG. 12C.

FIG. 12D shows a representation of the samples from the video signals V1, V2, and V3. The video signal V1 includes a sequence of video samples labeled as $S_{11}$, $S_{12}$, $S_{13}$, $S_{14}$, $S_{15}$, and so on, the video signal V2 includes a sequence of video samples labeled as $S_{21}$, $S_{22}$, $S_{23}$, $S_{24}$, $S_{25}$, and so on, and the video signal V3 includes a sequence of video samples labeled as $S_{31}$, $S_{32}$, $S_{33}$, $S_{34}$, $S_{35}$, and so on. For an NTSC signal, the video signals in adjacent lines are 180° out-of-phase. Also, when the NTSC signal is sampled at four times the subcarrier frequency, each sample is 90° out-of-phase with respect to the adjacent samples on the same video line. Horizontal comb filtering can be achieved as follows:

$$C_I=(2S_{23}-S_{21}-S_{25})/4, \text{ and}$$

$$Y_C=S_{23}-C_I. \qquad \text{Eq. (4)}$$

Similarly, vertical comb filtering can be achieved as follows:

$$C_I = (2S_{23} - S_{13} - S_{33})/4, \text{ and}$$

$$Y_C = S_{23} - C_I. \quad \text{Eq. (5)}$$

Adder circuits 1234 perform the computations shown by equation (4) or (5) depending on whether horizontal or vertical comb filtering is selected.

Adaptive comb filter 1200c can provide improved Y/C separation with small cross-coupling of the luminance component to the separated chrominance component, and vice versa, at both horizontal and vertical edges. Horizontal (or vertical) adaptive comb filtering can provide improved performance when a horizontal (or vertical) line exists in the video picture. In a simple implementation, the selection between horizontal and vertical comb filtering is achieved by detecting the amount of change in the amplitude of the samples in the vertical and horizontal directions. For example, vertical comb filtering can be performed if the amplitude difference in the vertical direction is less than the amplitude difference in the horizontal direction, as shown by the following:

$$|S_{13} - S_{33}| < |S_{21} - S_{25}|. \quad \text{Eq. (6)}$$

The amplitude difference expressed by equation (6) is a simple criterion shown for illustration. Other criteria can also be used to select the comb filtering mode and are within the scope of the invention. For example, criteria can be selected to better detect diagonal lines in the video picture.

FIG. 12C shows a simple embodiment of an adaptive comb filter that advantageously employs a variable delay. Specifically, the adaptive comb filter provides improved performance when the line delay is allowed to vary such that the adjacent video lines are approximately 180° out-of-phase. Other types and implementations of adaptive comb filters can also be designed and are within the scope of the invention. For example, another adaptive comb filter that can be used for Y/C separation is disclosed in U.S. Pat. No. 5,220,414, which is incorporated herein by reference.

Each of comb filters 1200a, 1200b, and 1200c can be used to implement: (1) chrominance filter 1010 and the luminance extraction portion of luminance filter 1012 in FIG. 10A, or (2) chrominance filter 1030 and the luminance extraction portion of luminance filter 1032 in FIG. 10B. Y/C separator and luminance processor 130b in FIG. 10B includes two delay elements 1020a and 1020b that are used to provide two lines of delay for the 2-D lowpass filtering. These delay elements can be used to implement the delay element(s) in comb filters 1200a, 1200b, and 1200c.

For example, delay element 1212 in comb filter 1200a can be implemented with either delay element 1020a or 1020b in Y/C separator and luminance processor 130b. Adders 1214 and 1216 then receive the signals S1 and S2, respectively (or the signals S2 and S3). Adder 1214 implements chrominance filter 1010 or 1030, and adder 1216 implements the luminance extraction portion of luminance filter 1012 or 1032.

Similarly, delay element 1222 in comb filter 1200b can be implemented with either delay element 1020a or 1020b. For comb filter 1200c, delay elements 1232a and 1232b can be implemented with delay elements 1020a and 1020b, and the signals S1, S2, and S3 (which correspond to the signals V1, V2, and V3, respectively) are provided to adder circuits 1234. Adder circuits 1234 implement the chrominance filter and the luminance extraction portion of the luminance filter.

Referring back to FIG. 10B, lowpass filtering is performed on the composite video signal S1 and its delayed versions S2 and S3 (and not on a luminance signal extracted from the composite video signal, as is the case for many conventional edge enhancement circuits). This allows for the sharing of delay elements 1020a and 1020b between chrominance filter 1030 and luminance filter 1032. In fact, since at least one delay element is typically used to implement chrominance filter 1030, the delay element(s) for luminance filter 1032 are practically obtained for free, without the need for additional memory for buffering. The design shown in FIG. 10B can thus provide improved performance while using minimal additional hardware.

Figure 13:
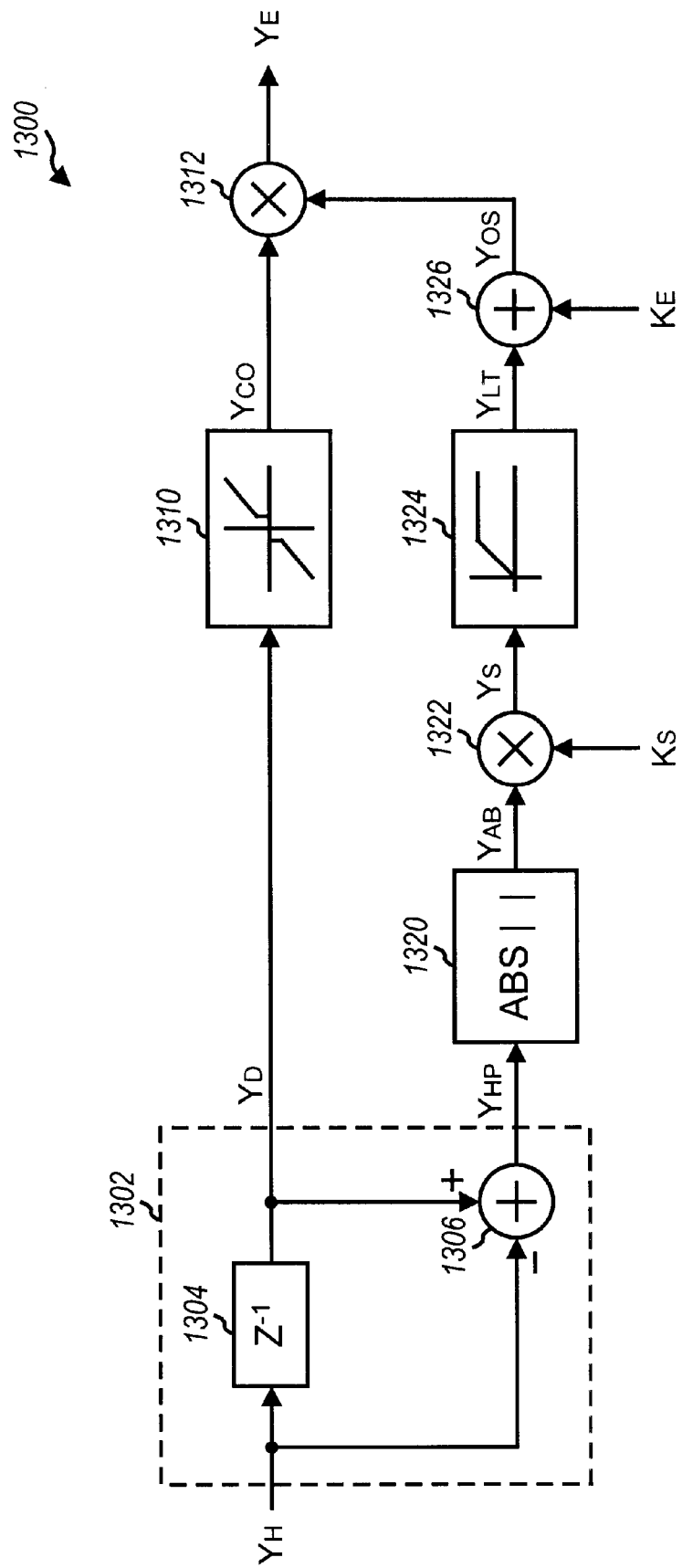
FIG. 13 shows a block diagram of a specific embodiment of an edge enhancement circuit.

FIG. 13 shows a block diagram of a specific embodiment of an edge enhancement circuit 1300. Edge enhancement circuit 1300 can be used to implement edge enhancement circuit 1014 in FIG. 10A or edge enhancement circuit 1034 in FIG. 10B. Within edge enhancement circuit 1300, the signal $Y_H$ indicative of the detected edges in the luminance signal is provided to an input filter 1302 that provides a highpass or bandpass signal $Y_{HP}$ and a delayed signal $Y_D$.

The delayed signal $Y_D$ is provided to a coring circuit 1310 that "cores" the signal $Y_D$ with a particular transfer function and provides the cored signal $Y_{CO}$ to a multiplier 1312. In an embodiment, coring circuit 1310 implements the following transfer function:

$$Y_{CO} = \begin{cases} Y_D & |Y_D| \geq V_{TH} \\ 0 & |Y_D| < V_{TH}, \end{cases} \quad \text{Eq. (7)}$$

where $V_{TH}$ is a particular threshold value.

Coring circuit 1310 provides an output signal $Y_{CO}$ that is a function of the input signal $Y_D$. If the magnitude of the input signal $Y_D$ is less than the threshold value $V_{TH}$, the output is set to zero. Otherwise, if the magnitude of the input signal $Y_D$ is equal to or greater than the threshold value $V_{TH}$, the output is set to the input. This transfer function suppresses high frequency noise in the input signal, which typically manifests itself as small changes in the signal amplitude. However, a luminance edge having a larger amplitude is passed by coring circuit 1310 with minimal changes.

In an embodiment, input filter 1302 is implemented as a first order differential circuit that includes a delay element 1304 and an adder 1306. Delay element 1304 receives and delays the signal $Y_H$ by one sample and provides the delayed signal $Y_D$ to adder 1306. Adder 1306 also receives and subtracts the signal $Y_H$ from the delayed signal $Y_D$ and provides a signal $Y_{HP}$ that includes high frequency components. The frequency response of the differential circuit is known in the art and not described herein. The signal $Y_{HP}$ has higher amplitudes near the center of a detected edge and lower amplitudes away from the edge center. The signal $Y_{HP}$ is then provided to an absolute element 1320 that generates absolute values of the signal $Y_{HP}$ by inverting the negative portion of the signal $Y_{HP}$. The signal $Y_{AB}$ from absolute element 1320 is indicative of the magnitude of the slope of the edges.

The absolute signal $Y_{AB}$ is provided to a scaling element 1322 that scales the signal with a gain factor $K_S$. The scaled signal $Y_S$ is provided to a limiter 1324 that limits (or clips) the signal to a particular peak amplitude value. The limited signal $Y_{LT}$ is provided to an adder 1326 that combines the signal $Y_{LT}$ with an offset factor $K_E$. The offsetted signal $Y_{OS}$ is provided to multiplier 1312 and multiplied with the cored signal $Y_{CO}$ to generate the signal $Y_E$ indicative of the enhanced luminance edges.

The sharpness of the edges can be controlled by adjusting the gain factor $K_S$ and the offset factor $K_E$. The gain factor $K_S$ determines the strength of the edge enhancement. Larger values for $K_S$ provide proportionally larger amounts of enhancement for the detected edges. The offset factor $K_E$ controls the sharpness of the edges in the output luminance signal $Y_I$ (i.e., $K_E$ acts as the sharpness control). When $K_E$ is set to less than 1.0, the luminance edges typically become more blurry and less sharp. Alternatively, when $K_E$ is set to greater than 1.0, the luminance edges typically become more sharp and crisp. The default value for $K_E$ can be 1.0, or some other values that can be empirically determined. $K_S$ and/or $K_E$ can also be adjustable (e.g., by a user).

Edge enhancement circuit 1300 provides edge enhancement via a non-linear transfer function of the input signal $Y_H$. Edge enhancement circuit 1300 receives the signal $Y_H$ indicative of the detected luminance edges and enhances the edges such that the output luminance signal $Y_I$ has sharper edges. Edge enhancement circuit 1300 can also be designed or adjusted to provide more blurry edges, which may be more desirable in some applications.

In an embodiment, the output signal from edge enhancement circuit 1300 has one or more of the following characteristics: (1) it is dynamically generated based on characteristics of the detected edges in the video signal; (2) it provides varying amounts of enhancement across the detected edges in the video signal; (3) it provides higher amounts of enhancement near the center of the detected edges and smaller amounts of enhancement away from the center; (4) it provides an amount of enhancement that is dependent on the slope of the detected edges; and other characteristics.

FIG. 13 shows a specific embodiment of the edge enhancement circuit. Various modifications can be made to the edge enhancement circuit, and this is within the scope of the invention. For example, the differential circuit can be replaced with a highpass filter, a bandpass filter, or some other filters that can be used to detect edges in a signal. Some of the elements in FIG. 13 can also be removed or replaced. For example, coring circuit 1310, absolute circuit 1320, scaling element 1322, limiter 1324, or adder 1326, or a combination thereof, can be removed from edge enhancement circuit 1300. In edge enhancement circuit 1300, the non-linear transfer function used for edge enhancement is implemented by processing the input signal $Y_H$ through one signal path (comprised of input filter 1302 through adder 1326), and multiplying the processed signal with a delayed version of the input signal $Y_H$.

Figure 14:
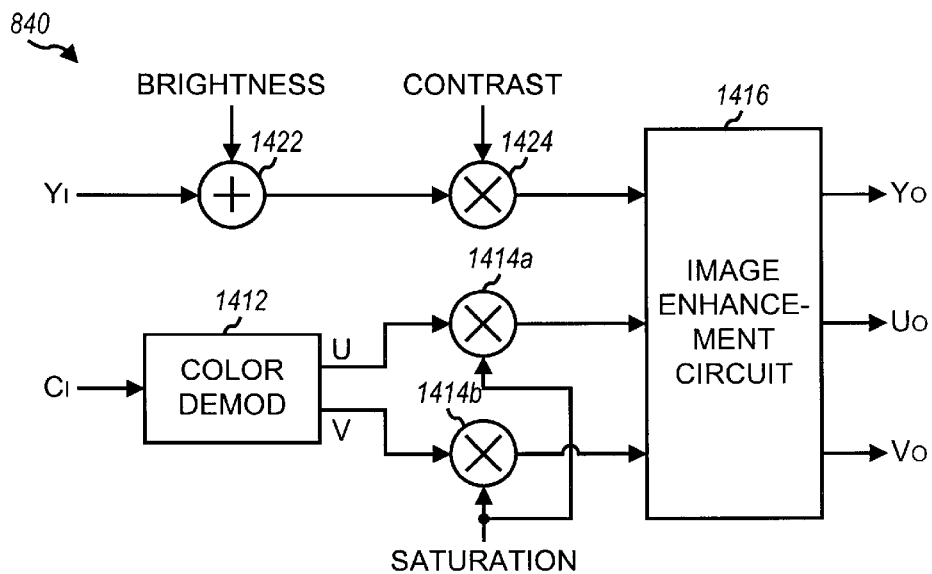
FIG. 14 shows a block diagram of an embodiment of a video demodulator.

FIG. 14 shows a block diagram of an embodiment of video demodulator 840. Video demodulator 840 receives and processes the luminance ($Y_I$) and chrominance ($C_I$) components from Y/C separator and luminance processor 830 and generates luminance ($Y_O$) and color difference ($U_O$ and $V_O$) components.

For an implementation in which the video samples are resampled at four times the subcarrier frequency, demodulation of the chrominance component can be easily achieved with a demultiplexer and a signal inversion circuit. At four times the subcarrier frequency, the inphase (i.e., cosine) sinusoid can be expressed as (1, 0, −1, 0, 1, 0, . . .) and the quadrature (i.e., sine) sinusoid can be expressed as (0, 1, 0, −1, 0, 1, . . .). The chrominance samples can be viewed as comprising the following sequence of samples (U, V, −U, −V, U, V, . . . ). Thus, every other chrominance sample can be provided as the U color difference sample, with alternate U color difference samples being inverted. Similarly, the remaining chrominance samples are provided as the V color difference samples, again with alternate V color difference samples being inverted. This simple color demodulation scheme is possible since burst-lock resampling is performed prior to color demodulation.

As shown in FIG. 14, the chrominance component $C_I$ is provided to a color demodulator 1412 that demodulates the color component in the manner described above. The chrominance component can be bandpass filtered prior to demodulation to reduce chrominance noise. The output color difference components U and V are provided to multipliers 1414a and 1414b, respectively, that also receive a saturation value. Each multiplier 1414 scales the received color difference component with the saturation value and provides the scaled component to an image enhancement circuit 1416.

Multipliers 1414 can be used to implement a chrominance automatic gain control (AGC) loop that adjusts the chrominance level to account for high frequency roll-off that is common in many video systems. The chrominance AGC loop can evaluate the amplitude of the color bursts and adjust the chrominance component such that the color burst amplitude is maintained at a particular signal level (e.g., +20 IRE). Multipliers 1414 can also be used for adjustment of chrominance saturation.

The luminance component $Y_I$ is provided to an adder 1422 that adds a brightness level to $Y_I$. The brightness adjusted Y is provided to a multiplier 1424 that scales the received Y with a contrast level. The scaled Y is provided to image enhancement circuit 1416.

Image enhancement circuit 1416 performs additional signal processing on the luminance and color difference components. Additional processing on the luminance and color difference components can include sharpening and cornering to compensate for the limited signal bandwidth at the encoder.

Figure 15:
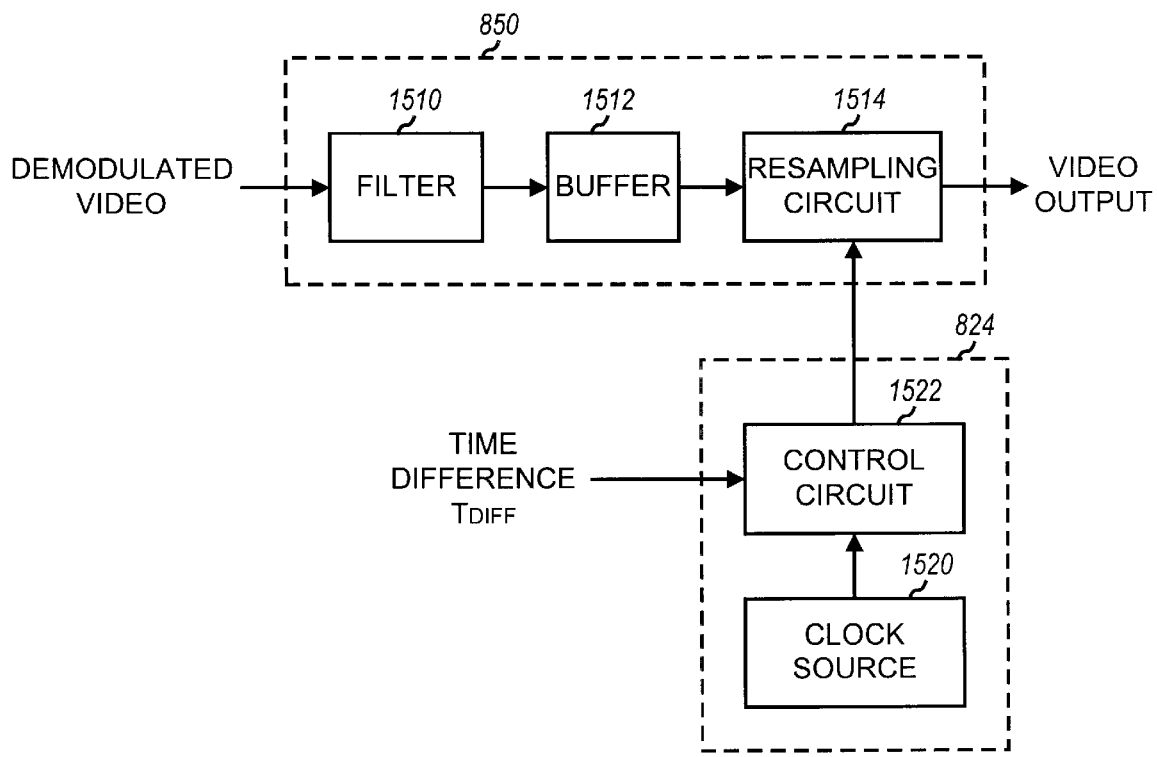
FIG. 15 shows a simplified block diagram of an embodiment of an output resampler.

FIG. 15 shows a simplified block diagram of an embodiment of output resampler 850. Resampler 850 receives and resamples the demodulated video samples from video demodulator 840 to provide output video samples. In an embodiment, the output video samples are also realigned in time to remove any picture misalignments caused by the input resampling, as described below.

Within resampler 850, the demodulated video samples are provided to an (optional) lowpass filter 1510 that removes high frequency components to prevent aliasing when resampling to a lower output sample rate. The filtered samples are provided to a buffer 1512 that provides the necessary buffering. The size of the buffer depends on the type of resampling being performed (e.g., horizontal resampling or vertical resampling, or both). The buffered samples are provided to a resampling circuit 1514 that performs the resampling. In an embodiment, resampling circuit 1514 is a linear interpolator that generates (or interpolates) samples at the output sample rate $f_{R2}$. Each interpolated sample $z[i]$ is based on two filtered samples, $d[i]$ and $d[i+1]$, and a phase difference $k[i]$ between the output sample $z[i]$ and the filtered sample $d[i]$. Resampling circuit 1514 can also be implemented using interpolators having more than two taps, or with other resampling architectures, and this is within the scope of the invention.

Resampler 850 receives samples at an input sample rate $f_{R1}$ and generates resampled video samples at an output sample rate $f_{R2}$. In one specific embodiment, the output sampling rate $f_{R2}$ is determined by an external clock source provided to video decoder 800. In another specific embodiment, the output sampling rate is fixed at a particular frequency, and can be generated as a fraction of a reference clock such at the sampling clock for ADC 816. In yet another specific embodiment, the output sampling rate is determined by a PLL that is locked to the line rate of composite video input signal. These embodiments can be used to support various applications. Video decoder 800 can be designed to support any combination of output resampling schemes described above and other output resampling schemes.

In embodiments in which the output samples are generated with a time offset (e.g., based on the time difference indicated by the control signal) to align the decoded picture, resampler 850 behaves as a skew compensation circuit. The skew compensation circuit may generate output samples having the same or different sample rate as that of the input samples.

Resampler 850 can be used as a scaler to provide output samples at a different horizontal sample rate or a different vertical sample rate, or both. The scaler can be used to provide, for example, picture-in-picture (PIP) feature.

Figure 16:
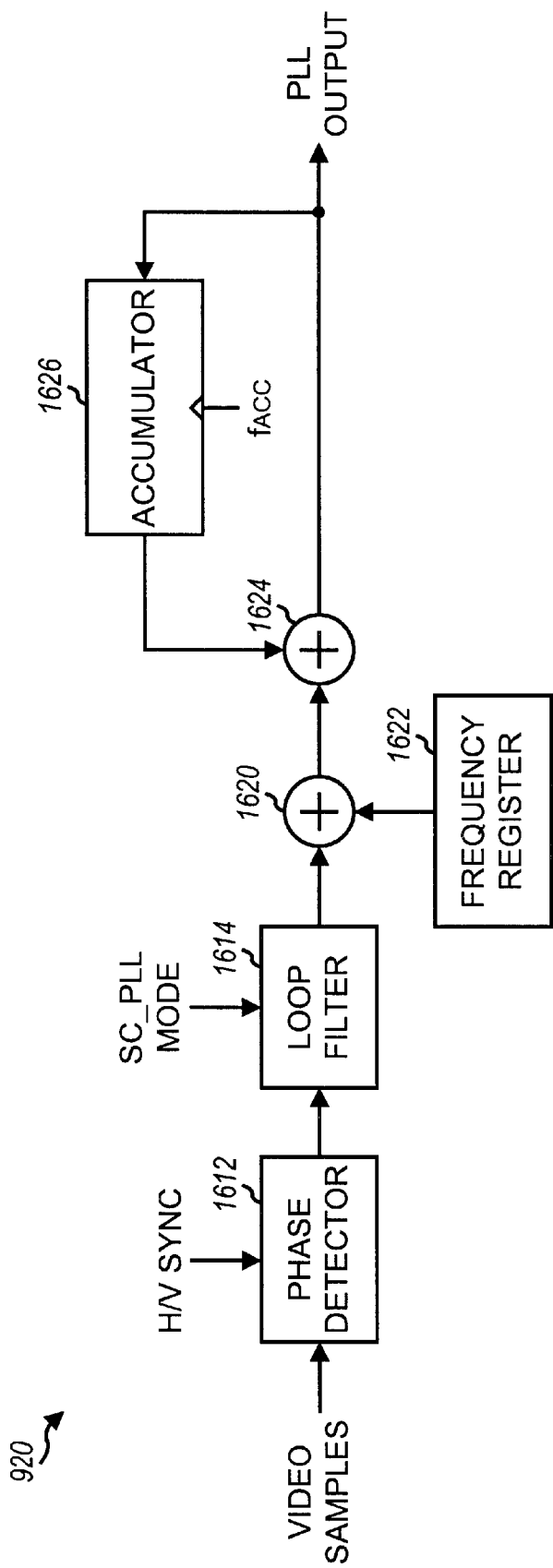
FIG. 16 shows a block diagram of an embodiment of a subcarrier PLL within a timing circuit in FIG. 9A.

FIG. 16 shows a block diagram of an embodiment of subcarrier PLL 920 within timing circuit 124 (see FIG. 9A). The resampled video samples from resampler 820 are provided to a phase detector 1612 that detects the phase error in the color bursts of the resampled video. When the resampling frequency $f_{R1}$ is phased-locked to the color subcarrier frequency $f_{SC}$ (e.g., $f_{R1}=4f_{SC}$), the resampled color bursts have a particular phase offset (e.g., zero) for each burst cycle. However, when the resampling frequency is not phased-locked to the color subcarrier frequency (e.g., $f_{R1} \neq 4f_{SC}$), the color bursts are sampled at varying locations and include varying phase errors. Phase detector 1612 is enabled only for time intervals when color bursts are present, as determined from the H/V SYNC signals.

Phase detector 1612 detects the color burst phase error and provides the detected phase error to a loop filter 1614. In an embodiment, loop filter 1614 operates in one of several operating modes (e.g., a fast mode and a slow mode), as determined by a control signal SC_PLL MODE. The fast mode has a wider loop bandwidth and provides shorter acquisition time and better frequency tracking when the signal is degraded. The fast mode can provide better performance for video signals from VCRs, especially during fast forward. However, if the bandwidth is excessively high, the color noise may be visible. The slow mode has a narrower loop bandwidth and provides reduced timing jitter caused by noise. The slow mode is typically used for higher quality video signals.

Loop filter 1614 filters or averages the phase error and provides the filtered error to an adder 1620. Adder 1620 also receives a frequency value from a frequency register 1622 and sums the two received values to generate an instantaneous frequency value that is provided to an NCO.

The NCO includes an adder 1624 and an accumulator 1626. Within the NCO, adder 1624 receives the instantaneous frequency value from adder 1620 and a phase value from accumulator 1626 and sums the two received values to generate an instantaneous phase value. This phase value is provided as the PLL output and is also stored back to accumulator 1626.

The NCO generates a synthesized clock signal from a reference (fixed) clock signal $f_{ACC}$. The reference clock signal can be the same as the sampling clock signal, or $f_{ACC}=f_{SAMP}$. The synthesized clock signal is then used to generate the resampling signal for resampler 120. The frequency of the synthesized clock signal can be expressed as follows:

$$f_{R1} = \frac{f_{VALUE}}{2^{ACC}} \cdot f_{ACC}, \qquad \text{Eq. (8)}$$

where $f_{VALUE}$ is the frequency value in register 1622, $f_{ACC}$ is the frequency of the clock signal for accumulator 1626, and ACC is the number of bits in accumulator 1626.

The PLL output from adder 1624 contains frequency and phase information of the synthesized clock signal used for resampling. The phase information is provided in the resampling signal used by resampler 120.

The invention can be implemented in various manners. For example, the invention can be implemented in hardware such as a processor, a micro-controller, a digital signal processor (DSP), an application specific integrated circuit (ASIC), or other circuits. The invention can also be implemented using software codes executed on a processor. The invention can also be implemented on a combination of hardware and software.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A sample rate converter comprising:
   a plurality of selector elements, each selector element configured to receive a respective set of one or more processed data samples and to provide one of the processed data samples, wherein each processed data sample is generated by delaying an input sample by zero or more clock cycles and scaling the sample by a particular scaling factor; and
   a summing circuit coupled to the plurality of selector elements, the summing circuit configured to receive and combine the processed data samples provided by the plurality of selector elements to generate an output sample.

2. The converter of claim 1, further comprising:
   a delay and scaler circuit coupled to the plurality of selector elements, the delay and scaler circuit configured to receive the input sample and provide one set of processed data samples for each of the plurality of selector elements.

3. The converter of claim 2, wherein the delay and scaler circuit includes
   one or more delay elements coupled in series and configured to receive the input sample, each delay element providing a delayed sample.

4. The converter of claim 3, wherein the delay and scaler circuit further includes
   scaling circuitry coupled to the one or more delay elements, the scaling circuitry configured to receive the input sample and one or more delayed samples and to scale selected ones of the input and delayed samples.

5. The converter of claim 1, wherein each selector element is implemented with a multiplexer having up to P inputs, where P corresponds to the number of discrete phases of an input sample clock.

6. The converter of claim 1, wherein the processed data samples provided by the plurality of selector elements comprise terms used to generate an interpolated sample at a particular phase.

7. The converter of claim 1, wherein the summing circuit is implemented with one or more 2-input adders.

8. The converter of claim 1, wherein the plurality of selector elements and the summing circuit are configured to implement a K-tap interpolator.

9. The converter of claim 1, wherein the plurality of selector elements and the summing circuit are configured to implement a 2-tap or higher number of taps interpolator.

10. The converter of claim 1, wherein the output sample corresponds to one of P phases of an input sample clock, where P is two or greater.

11. The converter of claim 10, wherein P is a power of two.

12. The converter of claim 11, wherein P is four, eight, sixteen, thirty-two, or sixty-four.

13. The converter of claim 1, wherein the scaling factor for each processed data sample is $2^N$, where N is an integer of zero or greater.

14. The converter of claim 1, wherein the processed data samples are derived from video samples.

15. The converter of claim 1, wherein the scaling is achieved by bit-shifting.

16. A sample rate converter comprising:
   a delay circuit configured to receive an input sample and provide a set of one or more delayed samples;
   a plurality of scaler and adder circuits, each scaler and adder circuit configured to receive the input sample or one delayed sample and to provide a respective set of processed samples, wherein each processed data sample is generated by scaling the received sample by a particular scaling factor;
   a plurality of selector elements coupled to the plurality of scaler and adder circuits, each selector element configured to receive the respective set of processed data samples and to provide one of the processed data samples; and
   a summing circuit coupled to the plurality of selector elements, the summing circuit configured to receive and combine samples provided by the plurality of selector elements to generate an output sample.

17. The converter of claim 16, wherein each scaler and adder circuit includes
   zero or more delay elements coupled in series and configured to delay respective received samples, and
   at least one adder coupled to the zero or more delay elements, the at least one adder configured to receive and combine selected ones of the received and delay samples to generate the set of processed data samples.

18. The converter of claim 16, wherein each set of processed data samples includes terms for all phases of a particular interpolation coefficient.

19. The converter of claim 16, wherein the plurality of scaler and adder circuits and summing circuit are configured to implement a K-tap interpolator, where K is two or greater.

20. The converter of claim 16, wherein the plurality of scaler and adder circuits and summing circuit are configured to implement a P-phase interpolator, where P is eight or greater.

21. A sample rate converter comprising:
   a delay circuit configured to receive an input sample and provide a set of one or more delayed samples;
   a plurality of scaler and adder circuits, each scaler and adder circuit configured to receive a set of input and delayed samples and provide an interpolated sample; and
   a selector element coupled to the plurality of scaler and adder circuits, the selector element configured to receive interpolated samples from the plurality of scaler and adder circuits and provide one of the interpolated samples as an output sample.

22. A method for performing sample rate conversion comprising:
   receiving a plurality of sets of processed data samples, wherein each processed data sample is generated by delaying an input sample by zero or more clock cycles and scaling the sample by a particular scaling factor;
   selecting one processed data sample from each of the plurality of sets, wherein the selected processed data samples from the plurality of sets are associated with a particular phase to be interpolated; and
   combining the selected processed data samples from the plurality of sets to generate an output sample.

23. The method of claim 22, further comprising:
   receiving the input sample;
   delaying the input sample to generate one or more delayed samples;
   scaling selected ones of the input and delayed samples to generate scaled samples; and
   assembling the scaled samples into the plurality of sets of processed data samples.

24. A video decoder for decoding a composite video signal comprising:
   a first sample rate converter configured to receive and resample input data samples to generate resampled video samples, the first sample rate converter including
      a plurality of selector elements, each selector element configured to receive a respective set of one or more processed data samples and to provide one of the processed data samples, wherein each processed data sample is generated by delaying an input sample by zero or more clock cycles and scaling the sample by a particular scaling factor, and
      a summing circuit coupled to the plurality of selector elements, the summing circuit configured to receive and combine samples provided by the plurality of selector elements to generate an output sample; and
   a Y/C separator coupled to the first sample rate converter, the Y/C separator configured to receive and separate the resampled video samples into luminance and chrominance components.

25. The video decoder of claim 24, further comprising:
   a color demodulator coupled to the Y/C separator, the demodulator configured to receive and demodulate the chrominance component into color difference components.

26. The video decoder of claim 25, further comprising:
   a second sample rate converter coupled to the color demodulator, the second sample rate converter configured to receive and resample the luminance and color difference components with a second resampling signal to generate output video components.

27. The video decoder of claim 24, further comprising:
   a timing circuit coupled to the first sample rate converter and configured to provide a control signal indicative of the phases of the resampled video samples.

* * * * *